(12) United States Patent
Higuchi et al.

(10) Patent No.: US 11,491,790 B2
(45) Date of Patent: Nov. 8, 2022

(54) LIQUID ABSORBER, LIQUID-ABSORBING SHEET, LIQUID ABSORBENT, AND IMAGE-FORMING APPARATUS

(71) Applicant: SEIKO EPSON CORPORATION, Tokyo (JP)

(72) Inventors: Naotaka Higuchi, Nagano (JP); Shogo Nakada, Nagano (JP); Yoichi Miyasaka, Nagano (JP); Kaneo Yoda, Nagano (JP); Nobutaka Urano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 231 days.

(21) Appl. No.: 17/109,286

(22) Filed: Dec. 2, 2020

(65) Prior Publication Data

US 2021/0170752 A1 Jun. 10, 2021

(30) Foreign Application Priority Data

Dec. 4, 2019 (JP) .............................. JP2019-219403
Dec. 4, 2019 (JP) .............................. JP2019-219404

(51) Int. Cl.
*B41J 2/165* (2006.01)
*B32B 5/02* (2006.01)
*B32B 29/02* (2006.01)

(52) U.S. Cl.
CPC ........... *B41J 2/16517* (2013.01); *B32B 5/022* (2013.01); *B32B 29/02* (2013.01); *B32B 2262/0276* (2013.01); *B32B 2262/062* (2013.01); *B32B 2307/72* (2013.01)

(58) Field of Classification Search
CPC ...... B41J 2/16517; B32B 5/022; B32B 29/02; B32B 2262/0276; B32B 2262/062; B32B 2307/72
See application file for complete search history.

(56) References Cited

U.S. PATENT DOCUMENTS

| | | | |
|---|---|---|---|
| 11,052,660 B2 * | 7/2021 | Nakazawa | ........... B41J 2/16508 |
| 11,059,294 B2 * | 7/2021 | Nakada | .................. B41J 2/1721 |
| 11,167,554 B2 * | 11/2021 | Yokokawa | ........... B41J 2/16517 |
| 2002/0042237 A1 | 4/2002 | Sameshima et al. | |
| 2014/0184692 A1 * | 7/2014 | Takano | ................ B41J 2/16508 347/31 |

(Continued)

FOREIGN PATENT DOCUMENTS

| | | |
|---|---|---|
| CN | 103895361 A | 7/2014 |
| JP | H09-158024 A | 6/1997 |

(Continued)

*Primary Examiner* — Cephia D Toomer
(74) *Attorney, Agent, or Firm* — Global IP Counselors, LLP

(57) ABSTRACT

A liquid absorber includes a container and an absorbing unit. The container has an opening and collects a liquid. The absorbing unit is an assembly of porous absorbent blocks, each containing fibers and a polymeric absorbent, and is in the container with spaces between the porous absorbent blocks. Each of the porous absorbent blocks has a first component and a second component. The first component is porous and has a density of 0.05 [g/cm$^3$] or more and 0.50 [g/cm$^3$] or less. The second component has a higher polymeric absorbent content than the first component.

19 Claims, 11 Drawing Sheets

(56) References Cited

U.S. PATENT DOCUMENTS

2016/0339707 A1    11/2016    Takano et al.

FOREIGN PATENT DOCUMENTS

| | | | |
|---|---|---|---|
| JP | 4240277 | B2 * | 3/2009 |
| JP | 2014-124891 | A | 7/2014 |
| JP | 2019-171596 | A | 10/2019 |
| JP | 2019-171597 | A | 10/2019 |
| WO | 2019/18744 | A1 | 10/2019 |
| WO | 2019/187443 | A1 | 10/2019 |

* cited by examiner

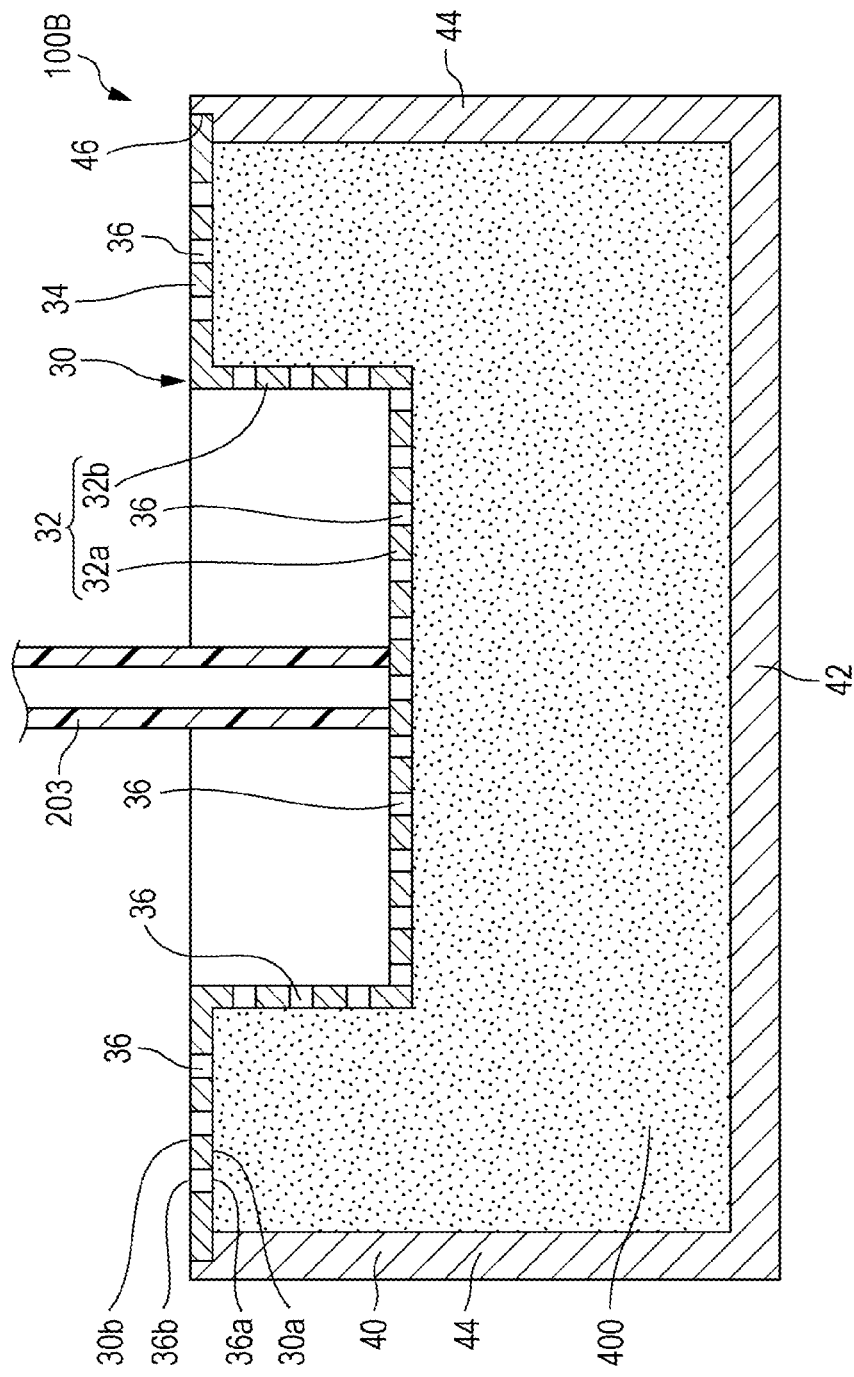

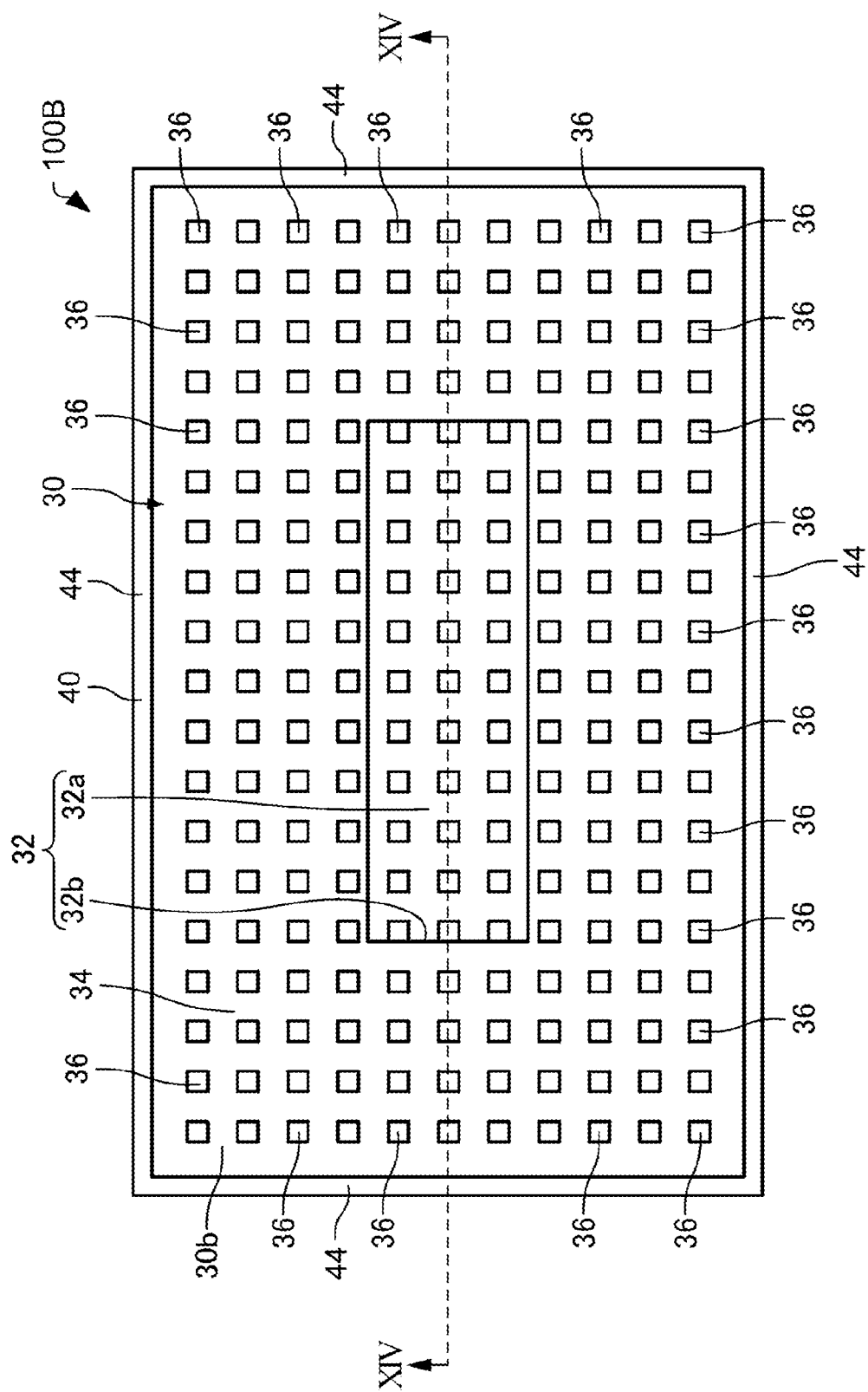

LIQUID ABSORBER, LIQUID-ABSORBING SHEET, LIQUID ABSORBENT, AND IMAGE-FORMING APPARATUS

The present application is based on, and claims priority from JP Application Serial Number 2019-219403, filed Dec. 4, 2019, and JP Application Serial Number 2019-219404, filed Dec. 4, 2019, the disclosures of which are hereby incorporated by reference herein in their entirety.

BACKGROUND

1. Technical Field

The present disclosure relates to a liquid absorber, a liquid-absorbing sheet, a liquid absorbent, and an image-forming apparatus.

2. Related Art

Ink jet printers produce waste ink, for example when they carry out head cleaning to prevent low print quality due to ink clogging and when they load ink after the replacement of an ink cartridge. To prevent accidental adhesion of the waste ink, for example to internal mechanisms, ink jet printers have a liquid absorber configured to absorb waste ink.

For example, JP-A-9-158024 discloses a liquid absorbent that includes a natural cellulose or synthetic fiber, a heat-fusible substance, and a thickener. Such a liquid absorbent is produced by blending and refining the natural cellulose or synthetic fiber with the heat-fusible substance and thickener in the air, thereby shaping the fibers into a mat, heating the resulting mat to a temperature equal to or higher than the melting point of the heat-fusible substance, and compressing the heated mat using a press roll.

By virtue of the use of the thickener, the liquid absorbent has good swelling properties; it expands little even after absorbing a liquid. The manufacturer, therefore, does not need to worry much about a volume increase after liquid absorption. The liquid absorbent can have a volume substantially equal to the space allowed for it.

Liquid absorbents are usually used in a container configured to hold a liquid. The liquid absorbent described in JP-A-9-158024 is produced by cutting the mat and stacking the cut pieces to a volume equal or similar to the capacity of the container to be used.

A disadvantage of this configuration is increased cost for the production of the liquid absorbent because of different cut patterns for the mat required for different containers. The mat, moreover, is so dense that once it swells by absorbing the thickened liquid, the swollen portions do not absorb the liquid any more. The absorbency of the mat is therefore limited to certain portions, hence low permeability to the liquid.

SUMMARY

A liquid absorber according to an aspect of the present disclosure includes a container that has an opening and collects a liquid, and an absorbing unit that is an assembly of porous absorbent blocks, each block containing fibers and a polymeric absorbent, and is in the container with spaces between the porous absorbent blocks. Each of the porous absorbent blocks has a first component that is porous and has a density of 0.05 $g/cm^3$ or more and 0.50 $g/cm^3$ or less, and a second component that has a higher polymeric absorbent content than the first component.

A liquid-absorbing sheet according to an aspect of the present disclosure includes a paper sheet and a polymeric absorbent supported thereon. The paper sheet is formed by fibers bound by a binder and has a density of 0.05 $g/cm^3$ or more and 0.5 $g/cm^3$ or less.

A liquid absorbent according to an aspect of the present disclosure includes an assembly of porous absorbent blocks. Each of the porous absorbent blocks has a first component that is porous and has a density of 0.05 $g/cm^3$ or more and 0.50 $g/cm^3$ or less, and a second component that has a higher polymeric absorbent content than the first component.

An image-forming apparatus according to an aspect of the present disclosure includes the liquid absorber according to an aspect of the present disclosure.

An image-forming apparatus according to an aspect of the present disclosure includes a container that holds one or both of the liquid-absorbing sheet according to an aspect of the present disclosure and cut pieces thereof.

BRIEF DESCRIPTION OF THE DRAWINGS

FIG. 14 is a cross-sectional diagram schematically illustrating a liquid absorber according to an embodiment.

FIG. 15 is a plan diagram schematically illustrating a liquid absorber according to an embodiment.

DESCRIPTION OF EXEMPLARY EMBODIMENTS

The following describes the details of a liquid absorber, a liquid-absorbing sheet, a liquid absorbent, and an image-forming apparatus according to aspects of the present disclosure based on the embodiments illustrated in the attached drawings.

1. Image-Forming Apparatus

Figure 1:
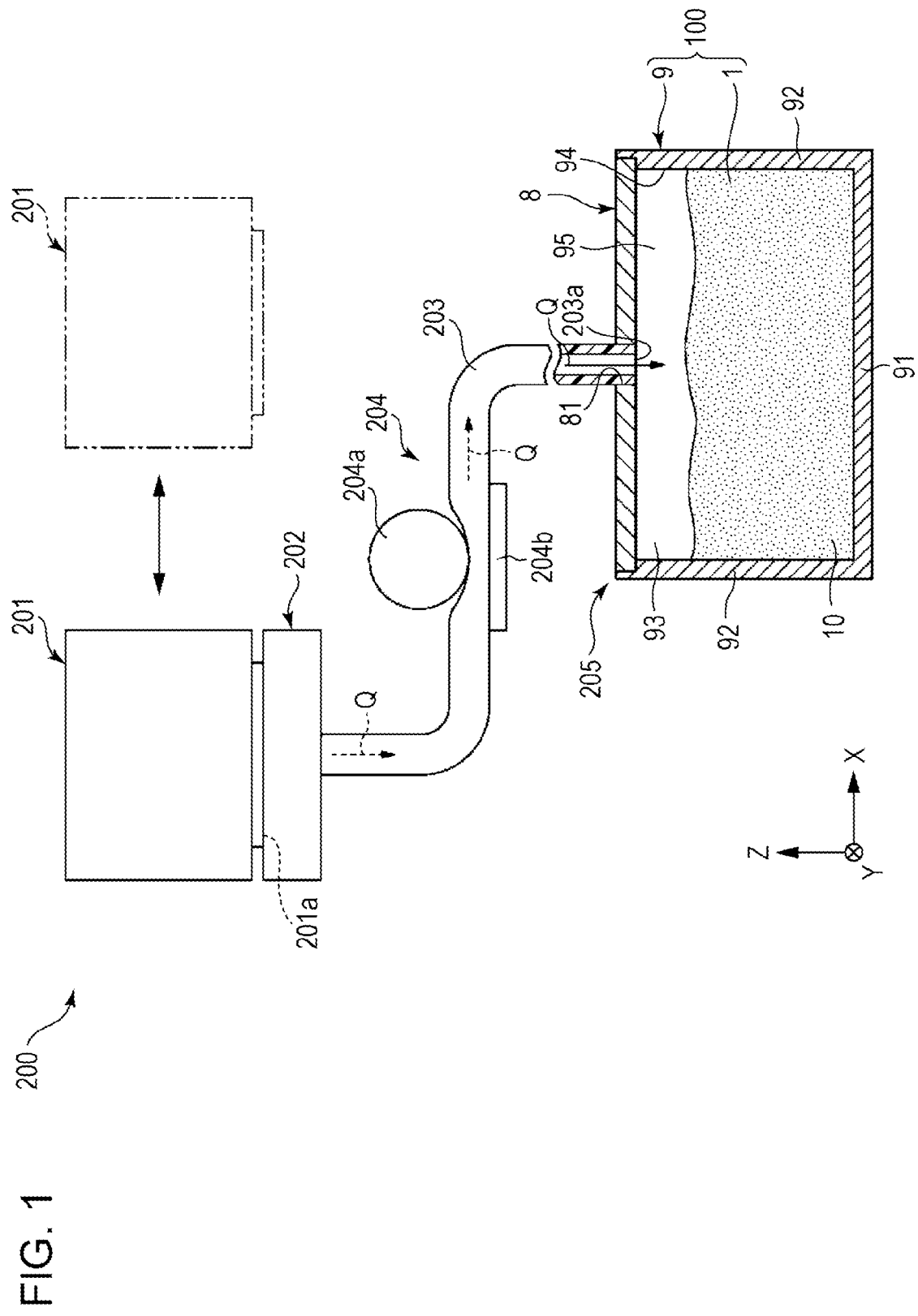
FIG. 1 is a partial vertical cross-sectional diagram illustrating a droplet-ejecting apparatus according to an embodiment and a liquid absorber according to an embodiment.

FIG. 1 is a partial vertical cross-sectional diagram illustrating a droplet-ejecting apparatus according to an embodiment and a liquid absorber according to an embodiment. It should be noted that the drawings attached to the present disclosure has three mutually perpendicular axes, the X-, Y-, and Z-axes. Each axis is indicated by an arrow. The direction in which the arrow points is the +(plus) direction of the axis, and the opposite is the −(minus) direction of the axis. The +Z direction is referred to as up, above, upper, etc., and the −Z direction is referred to as down, below, lower, etc.

The image-forming apparatus 200 illustrated in FIG. 1 is, for example, an ink jet color printer. This image-forming apparatus 200 includes a liquid absorber 100 that collects waste ink Q as an example of a liquid.

The image-forming apparatus 200 includes an ink-ejecting head 201 that ejects ink Q, a capping unit 202 that prevents the nozzles 201a of the ink-ejecting head 201 from clogging, a tube 203 that connects the capping unit 202 and the liquid absorber 100 together, a roller pump 204 that brings the ink Q from the capping unit 202, and a receiver section 205.

The ink-ejecting head 201 has multiple nozzles 201a, through which ink Q is ejected downwards. This ink-ejecting head 201 performs printing by moving relative to a recording medium, such as paper, and at the same time ejecting ink Q.

The capping unit 202 drains all nozzles 201a at once by a suction created by the roller pump 204 while the ink-ejecting head 201 is in its standby position, thereby preventing the nozzles 201a from clogging.

The tube 203 is a conduit through which the ink Q drained by the capping unit 202 is guided to the liquid absorber 100. The tube 203 is flexible.

The roller pump 204 is somewhere along the tube 203 and has a roller 204a and a clamp 204b that holds the tube 203 there together with the roller 204a. The roller 204a rotates to create a suction that acts on the capping unit 202 through the tube 203. The roller 204a continues rotating, thereby delivering the ink Q adhering to the nozzles 201a to the receiver section 205.

The receiver section 205 includes a liquid absorber 100 that has an absorbing unit 10. The ink Q is delivered to the liquid absorber 100 and absorbed as a waste liquid at the absorbing unit 10 inside the liquid absorber 100.

It should be noted that the liquid absorber 100 in this embodiment absorbs waste ink Q, but the liquid absorbed by the liquid absorber 100 does not need to be waste ink Q. Other liquids can also be absorbed.

2. Liquid Absorber

The liquid absorber 100 illustrated in FIG. 1 includes an absorbing unit 10, a container 9 that holds the absorbing unit 10, and a lid 8 attached to the container 9.

The liquid absorber 100 is detachably attached to the image-forming apparatus 200. In the attached state, it is used to absorb waste ink Q as described above. A liquid absorber 100 that has absorbed ink Q to its full capacity can be replaced with a new, or unused, liquid absorber 100.

2.1. Container

The container 9 holds the absorbing unit 10. The container 9 is shaped like a box, having a bottom 91 that is substantially rectangular in plan view and four side walls 92 standing upright along the sides of the bottom 91. The absorbing unit 10 is in a storage space 93, the space enclosed by the bottom 91 and four side walls 92.

The bottom 91 of the container 9 does not need to be substantially rectangular in plan view. For example, the bottom 91 may be round in plan view, and, therefore, the container 9 may be cylindrical as a whole. Alternatively, the shape of the bottom 91 in plan view may be polygonal or any other shape.

The container 9 may be flexible, but preferably is rigid. Being rigid herein means that the container 9 does not change its capacity by 10% or more under an internal or external pressure. Such a container 9 maintains its shape even when the absorbing unit 10 expands and pushes the container 9 from inside after absorbing ink Q. The container 9 therefore stays in a stable position inside the image-forming apparatus 200.

The material for the container 9 is not critical as long as it is impermeable to the ink Q. Examples include resin materials, such as cyclic polyolefins and polycarbonate, and metallic materials, such as aluminum and stainless steel.

The container 9 is see-through when transparent or translucent, but may be nontransparent.

The lid 8 is shaped like a plate and has been fitted into an upper opening 94 of the container 9, providing a liquid-proof seal of the upper opening 94. By virtue of this, ink Q does not scatter out even when, for example, it splashes up by hitting the absorbing unit 10. The lid 8 may be integral with the container 9 and may even be omitted.

In the middle of the lid 8 is a connection port 81 to which the tube 203 is connected. The connection port 81 is a hole that runs through the thickness of the lid 8, and the downstream end of the tube 203 is in this connection port 81. In this state, the outlet 203a of the tube 203 faces downwards (in the −Z direction). The waste ink Q discharged through the outlet 203a is allowed to fall straight down as droplets.

The orientation of the outlet 203a does not need to be as illustrated in FIG. 1. For example, the connection port 81 for the tube 203 is connected may be in a side wall 92 rather than the lid 8. In this case, the outlet 203a may face, for example, parallel to the horizontal plane, i.e., in the +X or −X direction or in the +Y or −Y direction. The outlet 203a, furthermore, may be inclined to the X, Y, or Z axis.

The lid 8 may have radial ribs or grooves, for example, around the connection port 81 on its lower surface. The ribs or grooves function to, for example, rectify the flow of the ink Q inside the container 9.

The lid 8 may be absorbent to the ink Q or may be repellent to the ink Q.

2.2. Absorbing Unit

Figure 2:
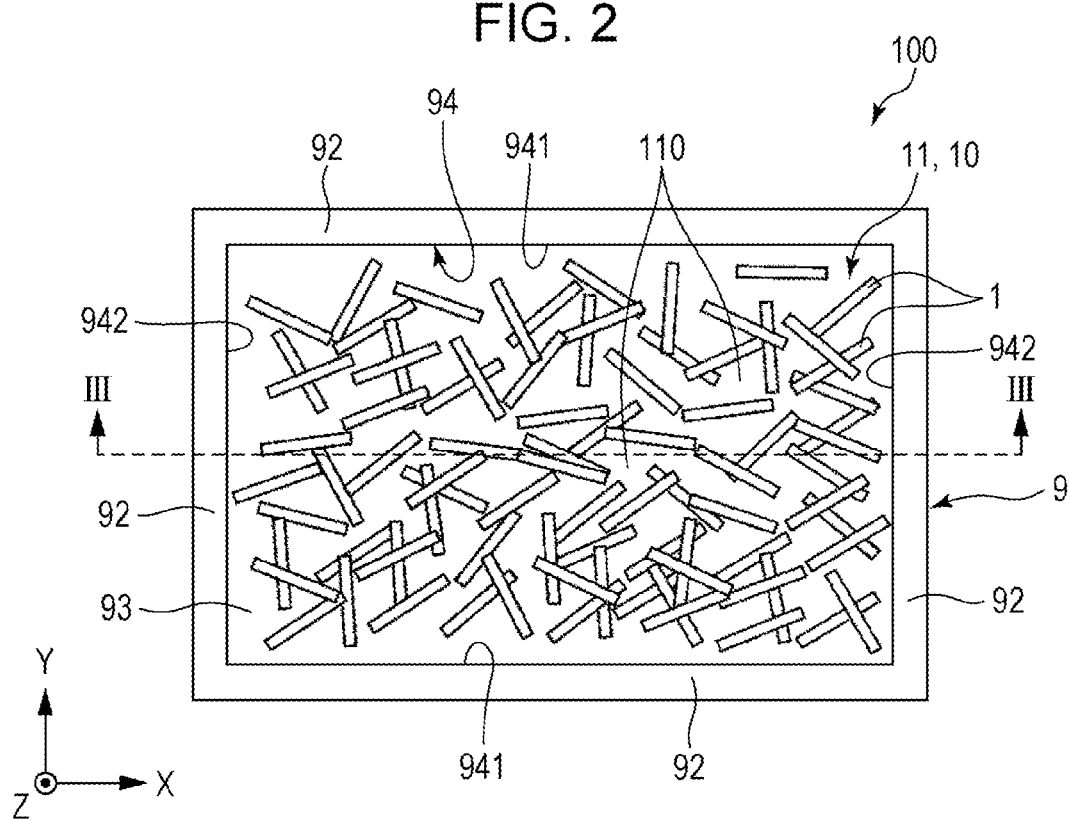
FIG. 2 is a detailed plan view of the liquid absorber illustrated in FIG. 1.
Figure 3:
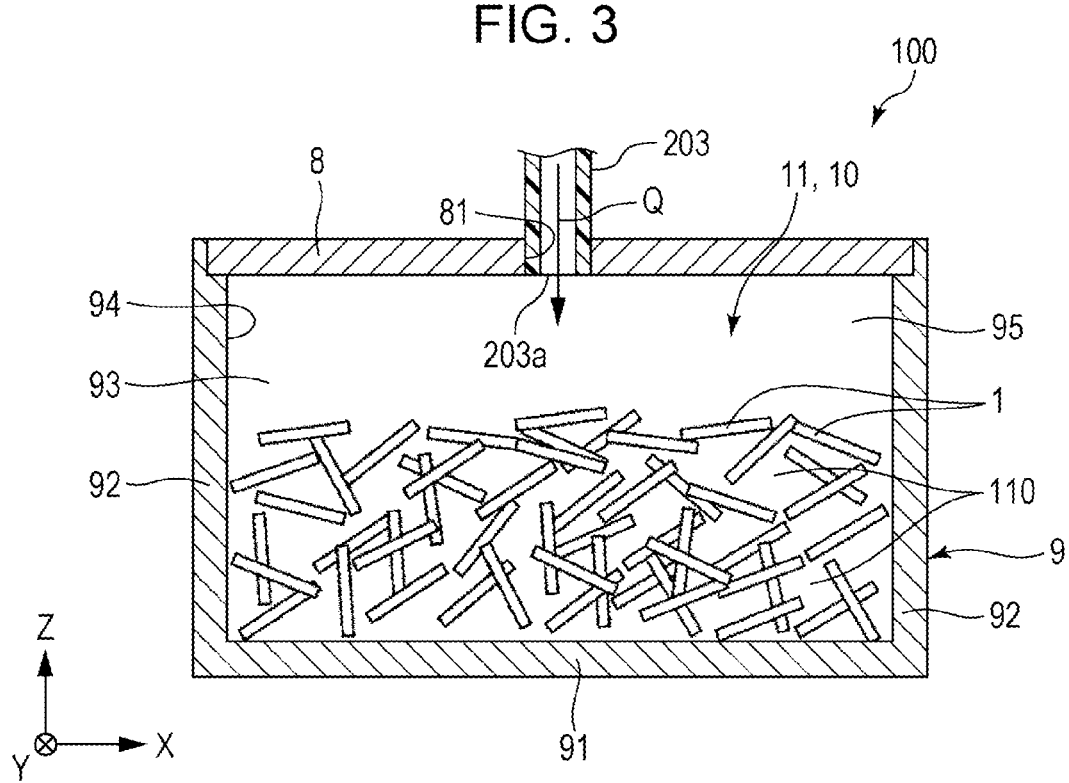
FIG. 3 is a cross-sectional view along line in FIG. 2.
Figure 4:
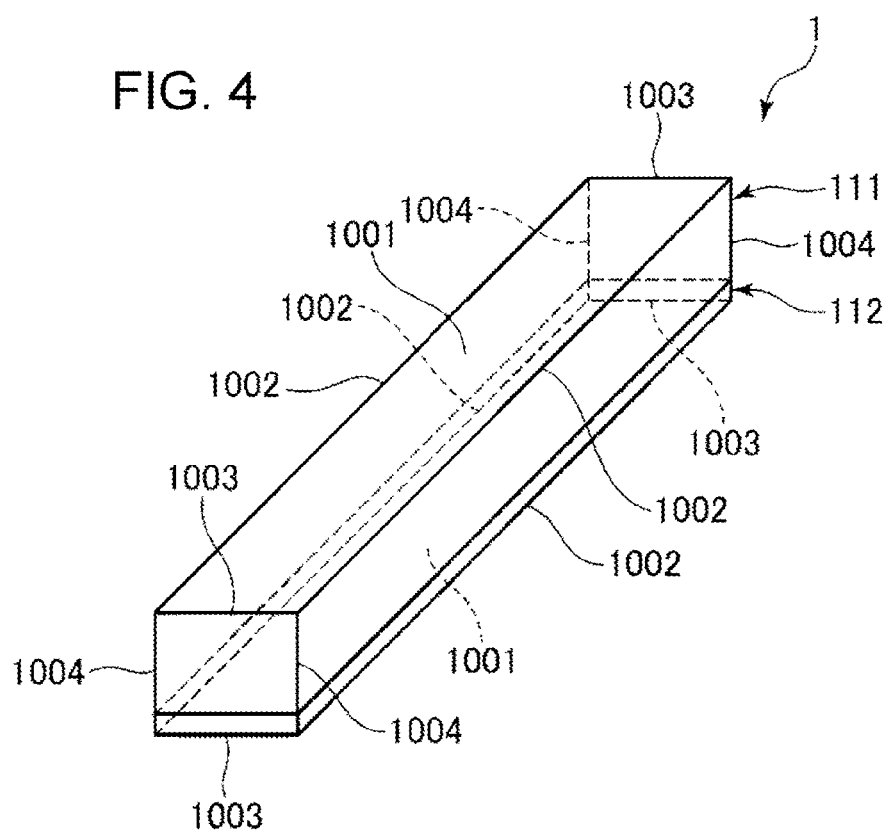
FIG. 4 is a perspective diagram illustrating an example of a porous absorbent block in the absorbent illustrated in FIGS. 2 and 3.
Figure 5:
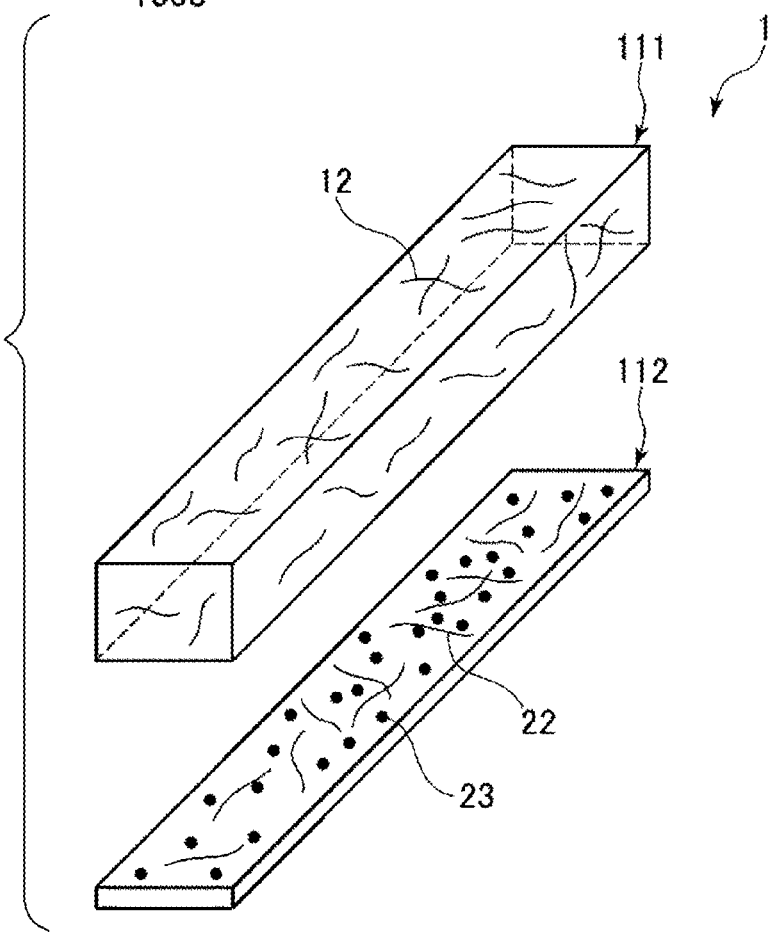
FIG. 5 is an exploded perspective view of FIG. 4.

FIG. 2 is a detailed plan view of the liquid absorber 100 illustrated in FIG. 1. FIG. 3 is a cross-sectional view along line III-III in FIG. 2. FIG. 4 is a perspective diagram illustrating an example of a porous absorbent block 1 in the absorbing unit 10 illustrated in FIGS. 2 and 3. FIG. 5 is an exploded perspective view of FIG. 4.

The absorbing unit 10, held in the container 9, is an assembly of multiple porous absorbent blocks 1 (block assembly 11) as illustrated in FIGS. 2 and 3. The number of porous absorbent blocks 1 in the container 9 is not critical and is selected according to relevant conditions, such as the purpose of use of the liquid absorber 100. The quantity of porous absorbent blocks 1 contained can be used to adjust the capacity of the liquid absorber 100 to absorb the ink Q.

Preferably, the ratio $V_B/V_A$ is 0.1 or more and 0.7 or less, where $V_A$ is the volume of the storage space 93 of the container 9, and $V_B$ is the total volume of the porous absorbent blocks 1 before absorbing the ink Q. More preferably, the ratio $V_B/V_A$ is 0.2 or more and 0.7 or less. This ensures there is an empty space 95 inside the container 9. The empty space 95 serves as a buffer when the porous absorbent blocks 1 expand after absorbing the ink Q, thereby helping the porous absorbent blocks 1 fully expand and absorb a sufficient amount of ink Q.

Each porous absorbent block 1 contains at least fibers 12 and a water-absorbing resin 23, which is a polymeric absorbent, and is block-shaped. In the container 9 is a block assembly 11, which is an assembly of porous absorbent blocks 1. As a result, there are spaces 110 between the porous absorbent blocks 1, and these spaces 110 allow the block assembly 11 to easily deform into any shape. The block assembly 11, or the absorbing unit 10, can therefore be packed efficiently into the storage space 93 of the container 9, whatever the shape of the storage space 93. Being block-shaped herein means that the block measures 1.0 mm or longer along its shortest side(s) and can be contained in its container 9 when stretched along its longest side(s).

The spaces 110 between the porous absorbent blocks 1 also help improve the permeability of the absorbing unit 10 to the waste liquid. By virtue of this, the absorbing unit 10 according to this embodiment addresses a disadvantage of a known type of liquid absorber: a mat extending over the entire bottom of its container swells by absorbing a liquid, and this swelling inhibits further absorption of the liquid. That is, the waste liquid penetrates quickly into the absorbing unit 10 through the spaces 110 and then is absorbed by the porous absorbent blocks 1. Impaired liquid absorption associated with swelling is therefore unlikely. The waste liquid thus spreads throughout the absorbing unit 10 in the container 9, and the absorbing unit 10 can absorb the liquid to its full capacity. This also ensures that the absorbed waste liquid does not easily leak out even when, for example, the liquid absorber 100 falls on its side with collected waste liquid therein.

Each of the porous absorbent blocks 1, moreover, has a first component 111 and a second component 112. The first component 111 is porous and has a density of 0.05 [g/cm$^3$] or more and 0.50 [g/cm$^3$] or less. The second component 112 has a higher polymeric absorbent content than the first component 111.

By virtue of including porous absorbent blocks 1 having such first and second components 111 and 112, the absorbing unit 10 combines liquid permeability, which is provided by the first component 111, and liquid absorbency, which is by the second component 112. Specifically, the first component 111 allows the waste liquid to penetrate and delivers it to the second component 112 quickly by virtue of being porous. The second component 112 absorbs and retains the delivered waste liquid with the use of the fibers 22 and water-absorbing resin 23 it contains.

Overall, the liquid absorber 100 according to this embodiment has a container 9 and an absorbing unit 10. The container 9 has an upper opening 94, which is an opening, and collects waste ink Q, which is a liquid. The absorbing unit 10 is an assembly of porous absorbent blocks 1 (block assembly 11) each containing fibers 22 and a water-absorbing resin 23, which is a polymeric absorbent, and is in the container 9 with spaces 110 between the porous absorbent blocks 1.

Each of the porous absorbent blocks 1 has a first component 111 and a second component 112. The first component 111 is porous and has a density of 0.05 [g/cm$^3$] or less to 0.50 [g/cm$^3$] or more. The second component 112 has a higher water-absorbing resin 23 content than the first component 111.

Such porous absorbent blocks 1 are highly permeable to liquids and at the same time exhibit good shape compliance inside their container 9. The resulting liquid absorber 100, therefore, is highly permeable to liquids and has a sufficiently large capacity to absorb liquids. The coexistence of two qualitatively different components in the porous absorbent blocks 1, moreover, helps achieve a better combination of liquid permeability and liquid absorbency.

When the density of the porous absorbent blocks 1 is below the lower limit, capillarity is unlikely to occur in their porous structure. The liquid permeability in the first component 111 is therefore low. The rigidity of the first component 111, moreover, is so low that the own weight of the absorbing unit 10 affects the unit's bulk density. When the density of the porous absorbent blocks 1 is above the upper limit, too, the liquid permeability in the first component 111 is low.

The density of the first component 111 is measured as follows.

First, the external dimensions of the first component 111 in its natural, or unloaded, state are measured to calculate the apparent volume of the first component 111. Then the dry mass of the first component 111 is measured. Dividing the measured mass by the apparent volume gives the density of the first component 111.

In this embodiment, each of the first and second components 111 and 112 is in layer form as illustrated in FIGS. 4 and 5. That is, the porous absorbent block 1 illustrated in FIGS. 4 and 5 is a stack of the first component 111 in layer form and the second component 112 in layer form. This ensures that the first and second components 111 and 112 are adjacent to each other in a broad area, thereby allowing the waste liquid that has penetrated the first component 111 to be delivered to the second component 112 smoothly. As a result, the liquid penetrates and is absorbed quickly.

Each of the first and second components 111 and 112 may be in a different form. The porous absorbent block 1 illustrated in FIGS. 4 and 5 has one first component 111 and one second component 112, but there may be two or more first components 111, and there may be two or more second components 112. Alternatively, first and second components 111 and 112 may alternate.

It is not critical how such porous absorbent blocks 1 are produced. In an example of a method, the fibers 12 are blended and refined with additives under dry or wet conditions. The refined fibers are layered to form a precursor of the first component 111. On this layer, the fibers 22 are layered with the water-absorbing resin 23 and other supported additives to form a precursor of the second component 112. The resulting mat is compressed and cut into blocks to complete the porous absorbent blocks 1.

The mat may be a stack of multiple sheets. In that case, the stacked sheets may have the same structure or may have different structures.

Alternatively, each porous absorbent block 1 may be a complex, or a stack, of the first component 111 in chip form and the second component 112 in chip form. Such a complex also ensures that the first and second components 111 and 112 are adjacent to each other, thereby allowing the waste liquid that has penetrated the first component 111 to be delivered to the second component 112 smoothly. As a result, the liquid penetrates and is absorbed quickly.

The form of a complex, furthermore, permits flexibility in the method for producing the first component 111 and that for the second component 112. For example, the manufacturer can give the top priority to liquid permeability in making the first component 111 and to liquid absorbency and liquid retention in making the second component 112. The joining together of the first and second components 111 and 112 may be achieved using an adhesive or any other agent or may be by direct connection with the use of entanglement.

It is not critical how such porous absorbent blocks 1 are produced. In an example of a method, the fibers 12 are blended and refined with additives under dry or wet conditions. The refined fibers are layered, and the resulting layer is compressed to form a mat as a precursor of the first component 111. This mat is cut into chips, giving the first component 111 in chip form. Then the fibers 22 are layered with the water-absorbing resin 23 and other supported additives, and the resulting layer is compressed to form a mat as a precursor of the second component 112. This mat is cut into chips, giving the second component 112 in chip form. The first component 111 in chip form and the second component 112 in chip form are joined together to complete the porous absorbent blocks 1.

The mat may be a stack of multiple sheets. In that case, the stacked sheets may have the same structure or may have different structures.

The ratio V1/V2, where V1 is the volume of the first component 111 and V2 is that of the second component 112, is selected to be appropriate for the intended balance between the functions of the first and second components 111 and 112. Preferably, the ratio V1/V2 is 0.15 or more and 400 or less, more preferably 1 or more and 200 or less, even more preferably 2 or more and 100 or less. A ratio V1/V2 in any such range helps achieve an optimal balance particularly between the liquid permeability and liquid absorbency of the porous absorbent blocks 1, thereby helping maximize the overall absorbent capacity of the absorbing unit 10.

When the ratio V1/V2 is below the lower limit, the volume V1 of the first component 111 may be too small. The penetration of the waste liquid by capillarity may therefore be small, potentially causing the overall absorbent capacity of the absorbing unit 10 to be small. When the ratio V1/V2 is above the upper limit, the volume V2 of the second component 112 may be too small. This can also cause the overall absorbent capacity of the absorbing unit 10 to be small.

The porous absorbent blocks 1 can have any shape as long as they are block-shaped. In FIG. 4, the porous absorbent block 1 is substantially a cuboid. Of the sides of the porous absorbent block 1 illustrated in FIG. 4, the two sides that are the largest in area are defined as primary surfaces 1001 and 1001. The two primary surfaces 1001 and 1001 are parallel with each other. This is merely an example, and the two primary surfaces 1001 may be at an angle to each other. Each primary surface 1001 is substantially rectangular, having two first sides 1002 and 1002, which are the long sides, and two second sides 1003 and 1003, which are the short sides. The four sides that connect the primary surfaces 1001 together are defined as third sides 1004, 1004, 1004, and 1004.

The longest side(s) of the porous absorbent blocks 1 is defined as "the first longest side(s)." In this embodiment, the two first sides 1002 and 1002 are the first longest sides. Likewise, the shortest side(s) of the porous absorbent blocks 1 is defined as "the first shortest side(s)." In this embodiment, the four third sides 1004, 1004, 1004, and 1004 are the first shortest sides.

As stated, the porous absorbent blocks 1 can have any length along the first longest side(s) as long as they can be contained in the container 9 when stretched along this side(s). Preferably, the length of the first longest side(s) is ½ or less, more preferably ⅓ or less, of the shortest side(s) of the upper opening 94. Specifically, the upper opening 94, which is the opening of the container 9, is rectangular, having two long sides 941 and 941 and two short sides 942 and 942. It is therefore preferred that the length of the first longest side(s), which is the longest side(s) of the porous absorbent blocks 1, be ½ or less of that of the short sides 942 of the upper opening 94, which are the shortest of the multiple sides of the upper opening 94.

In such a configuration, the absorbing unit 10 exhibits higher shape compliance inside the storage space 93 of the container 9. The absorbing unit 10 can therefore be packed into the container 9 to a higher density, and the porous absorbent blocks 1 have a sufficiently large capacity to absorb the liquid by capillarity. It is also easier to pack the porous absorbent blocks 1 into the storage space 93. When the length of the first longest side(s) is above the upper limit, it is very likely that the porous absorbent blocks 1 overlap. The overlap can cause the bulk density of the block assembly 11 to be too low, so low that the liquid absorbency of the absorbing unit 10 may be affected.

As for the lower limit, there is no particular lower limit to the length of the first longest side(s). To ensure that the spaces 110 between the porous absorbent blocks 1 are sufficiently large, however, it is preferred that the length of the first longest side(s) be 1/1000 or more, more preferably 1/500 or more, of the length of the shortest side(s) of the upper opening 94.

It should be noted that although the porous absorbent blocks 1 in this embodiment have rectangular primary surfaces 1001, this is not the only possible shape; the primary surface(s) of the porous absorbent blocks 1 may have a different shape.

The container 9 according to this embodiment, furthermore, has a cuboid storage space 93. When this storage space 93 is cut along a plane normal to the vertical axis, or the axis parallel with the up-down direction in FIG. 1, the cross-section has the same shape and size as the upper opening 94. In this embodiment, therefore, it is preferred that the length of the first longest side(s), or the longest side(s) of the porous absorbent blocks 1, be ½ or less, more preferably ⅓ or less, of the length of the shortest side(s) of a cross-section of the storage space 93 of the container 9 along a plane normal to the vertical axis. This provides the same advantages as described above. For the lower limit, too, the same applies as described above.

The shape of the storage space 93 does not need to be cuboid but can be a different shape. For example, the area of its cross-section along a plane normal to the vertical axis may vary along the vertical axis rather than being constant. In this case, too, it is preferred that the length of the first longest side(s), or the longest side(s) of the porous absorbent blocks 1, be ½ or less, more preferably ⅓ or less, of the length of the shortest side(s) of a cross-section of the storage space 93 of the container 9 along a plane normal to the vertical axis. This provides the same advantages as described above. For the lower limit, too, the same applies as described above.

The shape of the upper opening 94 and the cross-section does not need to be rectangular but can be any other shape having multiple sides, i.e., polygonal, such as square, hexagonal, or octagonal.

The shape of the upper opening 94 and the cross-section, moreover, does not need to be polygonal but can be circular, such as perfectly round, oval, or ellipsoidal, or any other shape. In a non-polygonal shape, the longest possible segment(s) in the upper opening 94 or cross-section is considered the "shortest side(s)" of the opening or cross-section.

As stated, the length of the first longest side(s), or the longest side(s) of the porous absorbent blocks 1, is selected preferably according to conditions such as the size of the container 9, but preferably is 5 mm or more and 50 mm or less for example. Porous absorbent blocks 1 having such a size are easy to handle and are unlikely to be unevenly distributed in the storage space 93.

Overall, it is preferred that the upper opening 94, which is the opening of the container 9, have multiple sides and that the length of the first longest side(s), or the longest side(s) of the porous absorbent blocks 1, be 5 mm or more and ½ or less of the length of the short sides 942 of the upper opening 94, which are the shortest of the multiple sides of the upper opening 94.

In such a configuration, the porous absorbent blocks 1 are easy to handle and at the same time exhibit good shape compliance, and therefore are unlikely to be unevenly distributed, in the storage space 93. The absorbing unit 10 can therefore be packed to a high density.

Preferably, the first aspect ratio, which is the ratio of the length of the first longest side(s) to that of the first shortest side(s), is 5 or more for example, more preferably 10 or more and 100 or less. This helps give the block assembly 11 an adequate bulk density, thereby helping further improve liquid penetration at the absorbing unit 10. When the length of the first longest side(s) is in the aforementioned range and the first aspect ratio is in any of the above ranges, the length of the first shortest side(s) is larger than the thickness of a sheet of ordinary paper. The porous absorbent blocks 1 in this case therefore combine a thickness larger than that of paper, specifically a thickness of 0.1 mm or more and 20 mm or less, and a density lower than that of paper by virtue of being porous.

The multiple porous absorbent blocks 1, furthermore, may be the same or may be different in shape, size, material, etc.

Preferably, the bulk density of the block assembly 11 is 0.25 A $[g/cm^3]$ or more and 1.50 A $[g/cm^3]$ or less, more preferably 0.40 A $[g/cm^3]$ or more and 1.20 A $[g/cm^3]$ or less, where A is the density $[g/cm^3]$ of the first component 111 of the porous absorbent blocks 1. This ensures that the absorbing unit 10 is sufficiently permeable to liquids, thereby further reducing impaired liquid absorption associated with swelling.

The bulk density of the block assembly 11 is measured as follows.

First, the external dimensions of the block assembly 11 in the container 9 are measured to calculate the apparent volume of the block assembly 11. When the container 9 contains any element other than the porous absorbent blocks 1 as an element of the absorbing unit 10, the calculated apparent volume of the block assembly 11 should include the volume of this element. Then the mass of the block assembly 11 alone is measured. Dividing the measured mass by the apparent volume gives the bulk density of the block assembly 11.

The bulk density of the block assembly 11 can be adjusted by changing, for example, geometric parameters of the porous absorbent blocks 1, such as length, aspect ratio, and curvature. Specifically, increasing the curvature (reducing the bend radius) of the porous absorbent blocks 1, for example, reduces the bulk density of the block assembly 11.

2.2.1. First Component

The first component 111 of the porous absorbent blocks 1 can be made of any material as long as it is porous and contains fibers 12 as illustrated in FIG. 5. Examples of fibers 12 include synthetic resin fibers, such as polyester fibers and polyamide fibers; and natural resin fibers, such as cellulose fibers, keratin fibers, and fibroin fibers, and their chemically modified versions. One such type of fiber can be used alone, or two or more types can be blended as necessary.

Examples of polyester fibers include polyethylene terephthalate (PET) fiber, polyethylene naphthalate (PEN) fiber, polytrimethylene terephthalate (PTT) fiber, and polytributylene terephthalate (PBT) fiber.

Examples of polyamide fibers include aliphatic polyamide fibers, such as nylon, and aromatic polyamide fibers, such as aramid.

Cellulose fibers are fibrous materials that are primarily the compound cellulose, or cellulose in a narrow sense. Cellulose fibers may contain hemicellulose and lignin besides cellulose.

The fibers 12 may be contained in fabric form, for example as woven or nonwoven fabric, or may be contained in their raw state. The fabric may be a sheet or multiple sheets of fabric, but when multiple sheets of fabric are used, it is preferred that the other elements, such as raw fibers 12 and additives (described below), be interposed between the sheets. This helps prevent the fibers 12 and other elements from coming out of the first component 111.

Besides the fibers 12, the porous absorbent blocks 1 may contain additives. Examples of additives include binders, flame retardants, surfactants, lubricants, defoamers, fillers, anti-blocking agents, ultraviolet absorbers, coloring agents, and flow improvers. The absorbing unit 10, too, may contain such additives.

Binders make the fibers 12 stick together, for example through heat fusion, thereby ensuring the porous absorbent blocks 1 retain their shape. An example of a binder is a thermoplastic resin. Examples of thermoplastic resins include polyvinyl acetate, polyvinyl alcohol, polyvinyl butyral, polystyrene, ABS (acrylonitrile butadiene styrene) resins, methacrylic resins, NORYL resins, polyurethane, ionomeric resins, cellulose plastics, polyethylene, polypropylene, polyamide, polycarbonate, polyacetal, polyphenylene sulfide, polyvinylidene chloride, polyethylene terephthalate, and fluoropolymers.

Flame retardants render the porous absorbent blocks 1 incombustible. Examples of flame retardants include halogen flame retardants, phosphorus flame retardants, nitrogen-compound flame retardants, silicone flame retardants, and inorganic flame retardants.

The first component 111 may contain a polymeric absorbent, such as a water-absorbing resin 23 as described below, but preferably is free of polymeric absorbents. Being free of polymeric absorbents herein means that the polymeric absorbent content of the first component 111 is 5% by mass or less of the mass of the first component 111 as a whole. Making the first component 111 polymeric absorbent-free will ensure that the problem of impaired liquid absorption caused by a swollen polymeric absorbent is unlikely to occur in this component. A polymeric absorbent-free first component 111 is therefore efficient in delivering the waste liquid to the second component 112 by virtue of its superior liquid permeability.

The average length of the fibers 12 is not critical, but preferably is 0.1 mm or more and 7.0 mm or less, more preferably 0.1 mm or more and 5.0 mm or less, even more preferably 0.2 mm or more and 3.0 mm or less.

The average diameter of the fibers 12 is not critical, but preferably is 0.05 mm or more and 2.00 mm or less, more preferably 0.10 mm or more and 1.00 mm or less.

The average aspect ratio, i.e., the ratio of the average length to the average diameter, of the fibers 12 is not critical, but preferably is 10 or more and 1000 or less, more preferably 15 or more and 500 or less.

The average length and average diameter of the fibers 12 are the mean length and mean diameter, respectively, of at least 100 fibers 12.

2.2.2. Second Component

The second component 112 of the porous absorbent blocks 1 contains fibers 22 and a water-absorbing resin 23, which is a polymeric absorbent, as illustrated in FIG. 5. The water-absorbing resin 23 may be contained in any form, provided that the second component 112 has a higher water-absorbing resin 23 content than the first component 111. Preferably, for example, the water-absorbing resin 23 is supported by the fibers 22. This ensures that the water-absorbing resin 23, which absorbs liquids, is adjacent to the fibers 22, which absorb liquids by capillarity. The waste liquid that has penetrated the fibers 22 is therefore delivered to the water-absorbing resin 23 thereafter, and the water-absorbing resin 23 swells and retains or holds the liquid.

The configuration of the fibers 22 is, for example, an appropriate one selected from the configurations described above in relation to the fibers 12. The presence of fibers 22 in the second component 112 is optional. That is, the fibers 22 may be omitted.

The water-absorbing resin 23 only needs to be a polymer that is absorbent to water and can be of any kind, but examples include carboxymethyl cellulose, polyacrylic acid, polyacrylamide, starch-acrylic acid graft copolymers, hydrolysates of starch-acrylonitrile graft copolymers, vinyl acetate-acrylate copolymers, polymers like copolymers of isobutylene and maleic acid, hydrolysates of acrylonitrile copolymers or acrylamide copolymers, polyethylene oxide, polysulfonic-acid compounds, and polyglutamic acid and salts or neutralized derivatives and crosslinked forms thereof. Being absorbent to water in this context means that the polymer is hydrophilic and retains water. Many of water-absorbing resins 23 gel once they absorb water.

Water-absorbing resins 23 that have a pendant functional group are particularly preferred. Examples of functional groups include acid groups, the hydroxyl group, the epoxy group, and the amino group. It is particularly preferred that the water-absorbing resin 23 have a pendant acid group, more preferably a pendant carboxyl group.

Examples of carboxyl-containing units that may form the resin's side chains include those derived from monomers such as acrylic acid, methacrylic acid, itaconic acid, maleic acid, crotonic acid, fumaric acid, sorbic acid, and cinnamic acid and anhydrides and salts thereof.

When the water-absorbing resin 23 has a pendant acid group, it is preferred that the percentage of acid groups in the water-absorbing resin 23 that have been neutralized to form a salt be 30 mol % or more and 100 mol % or less, more preferably 50 mol % or more and 95 mol % or less, even more preferably 60 mol % or more and 90 mol % or less, the most preferably 70 mol % or more and 80 mol % or less. This helps further improve the absorption of the liquid by the water-absorbing resin 23.

The salt formed by the neutralization can be of any kind. Examples include alkali metal salts, such as the sodium salt, the potassium salt, and the lithium salt, and salts of nitrogen-containing basic compounds, such as ammonia. The sodium salt is particularly preferred. The presence of a sodium salt helps further improve the liquid absorption by the water-absorbing resin 23.

Water-absorbing resins 23 having a pendant acid group are advantageous in that they are quick to absorb a liquid by virtue of the electrostatic repulsion between the acid groups that occurs when they absorb the liquid. When the acid group has been neutralized, moreover, osmotic pressure accelerates the absorption of the liquid to the inside of the water-absorbing resin 23.

The water-absorbing resin 23 may have a constituting unit that contains no pendant acid group. Examples of such constituting units include hydrophilic constituting units, hydrophobic constituting units, and constituting units to serve as polymerizable crosslinkers.

Examples of hydrophilic constituting units include ones derived from nonionic compounds, such as acrylamide, methacrylamide, N-ethyl (meth) acrylamide, N-n-propyl (meth) acrylamide, N-isopropyl (meth)acrylamide, N,N-dimethyl (meth) acrylamide, 2-hydroxyethyl (meth) acrylate, 2-hydroxypropyl (meth) acrylate, methoxypolyethylene glycol (meth)acrylate, polyethylene glycol mono(meth)acrylate, N-vinylpyrrolidone, N-acryloylpiperidine, and N-acryloylpyrrolidine. (Meth)acrylic and a (meth)acrylate as mentioned herein refer to acrylic or methacrylic and an acrylate or methacrylate, respectively.

Examples of hydrophobic constituting units include those derived from compounds such as (meth)acrylonitrile, styrene, vinyl chloride, butadiene, isobutene, ethylene, propylene, stearyl (meth)acrylate, and lauryl (meth)acrylate.

Examples of constituting units to serve as polymerizable crosslinkers include those derived from, for example, diethylene glycol diacrylate, N,N-methylenebisacrylamide, polyethylene glycol diacrylate, polypropylene glycol diacrylate, trimethylolpropane diallyl ether, trimethylolpropane triacrylate, allyl glycidyl ether, pentaerythritol triallyl ether, pentaerythritol diacrylate monostearate, bisphenol diacrylate, isocyanuric acid diacrylate, tetraallyloxyethane, and diallyloxyacetates.

It is particularly preferred that the water-absorbing resin 23 contain a polyacrylate copolymer or crosslinked polyacrylic acid. Advantages of this include, for example, improved performance in absorbing the liquid and reduced production cost.

A crosslinked polyacrylic acid is preferably one in which the percentage of carboxyl-containing constituting units to all constituting units forming the molecular chain is 50 mol % or more, more preferably 80 mol % or more, even more preferably 90 mol % or more. When the percentage of carboxyl-containing constituting units is too small, it may be difficult to achieve sufficiently high performance in absorbing the liquid.

Preferably, a subset of the carboxyl groups in the crosslinked polyacrylic acid have been neutralized, or the polymer has been partially neutralized, to form a salt. The percentage of neutralized carboxyl groups to all carboxyl groups in the crosslinked polyacrylic acid is preferably 30 mol % or more and 99 mol % or less, more preferably 50 mol % or more and 99 mol % or less, even more preferably 70 mol % or more and 99 mol % or less.

The water-absorbing resin 23, furthermore, may have a crosslinked structure formed using a crosslinking agent that is not a polymerizable crosslinker as mentioned above.

When the water-absorbing resin 23 has an acid group, an example of a preferred crosslinking agent is a compound having multiple functional groups that react with the acid group.

When the water-absorbing resin 23 has a functional group that reacts with acid groups, an example of a suitable crosslinking agent is a compound that has in its molecule multiple functional groups that react with acid groups.

Examples of compounds that have multiple functional groups that react with acid groups include glycidyl ether compounds, such as ethylene glycol diglycidyl ether, trimethylolpropane triglycidyl ether, (poly)glycerol polyglycidyl ether, diglycerol polyglycidyl ether, and propylene glycol diglycidyl ether; polyhydric alcohols, such as (poly)glycerol, (poly)ethylene glycol, propylene glycol, 1,3-propanediol, polyoxyethylene glycol, triethylene glycol, tetraethylene glycol, diethanolamine, and triethanolamine; and polyamines, such as ethylenediamine, diethylenediamine, polyethyleneimine, and hexamethylenediamine. Substances like polyvalent ions, for example of zinc, calcium, magnesium, and aluminum, are also suitable because they function as crosslinkers by reacting with the acid group the water-absorbing resin 23 has.

The water-absorbing resin 23 can be in any shape, such as flake-shaped, needle-like, fibrous, or particulate, but preferably is particulate in large part. Using a particulate water-absorbing resin 23 is an easy way to ensure sufficient liquid permeability. The particulate form is also suitable for support by the fibers 22. Being particulate in this context means that the aspect ratio, i.e., the ratio of the minimum length to the maximum length, is 0.3 or more and 1.0 or less. Preferably, the average diameter of the particles is 50 µm or more and 800 µm or less, more preferably 100 µm or more and 600 µm or less, even more preferably 200 µm or more and 500 µm or less. The average diameter of the particles in this context is the mean measured diameter of at least 100 of the particles.

Preferably, the ratio by mass of the water-absorbing resin 23 to the fibers 22 is 0.15 or more and 1.75 or less, more preferably 0.20 or more and 1.50 or less, even more preferably 0.25 or more and 1.20 or less. This helps achieve a better combination of liquid permeability, which is provided by the fibers 22, and liquid absorbency, which is by the water-absorbing resin 23.

Besides the fibers 22 and water-absorbing resin 23, the second component 112 may contain additives. Examples of additives include surfactants, lubricants, defoamers, fillers, anti-blocking agents, ultraviolet absorbers, coloring agents, flame retardants, and flow improvers.

The foregoing is a description of the absorbing unit 10. The block assembly 11 that forms such an absorbing unit 10 may have a uniform bulk density in the storage space 93 or may have different bulk densities from part to part.

The absorbing unit 10 is a liquid absorbent according to this embodiment. It includes an assembly of porous absorbent blocks 1 (block assembly 11), and each of the porous absorbent blocks 1 has a first component 111 and a second component 112. The first component 111 is porous and has a density of 0.05 [g/cm$^3$] or less to 0.50 [g/cm$^3$] or more. The second component 112 has a higher water-absorbing resin 23 (polymeric absorbent) content than the first component 111.

Such an absorbing unit 10 is highly permeable to liquids and at the same time exhibits good shape compliance in its container 9. The absorbing unit 10, therefore, is highly permeable to liquids and has a sufficiently large capacity to absorb liquids. The coexistence of two qualitatively different components in the porous absorbent blocks 1, moreover, helps achieve a better combination of liquid permeability and liquid absorbency.

The image-forming apparatus 200 illustrated in FIG. 1 includes a liquid absorber 100 that has such an absorbing unit 10. The liquid absorber 100 therefore includes porous absorbent blocks 1 packed therein that are highly permeable to liquids, absorb liquids well, and exhibit good shape compliance in their container 9. The waste liquid it receives therefore spreads throughout the absorbing unit 10 and is absorbed to the full capacity of the absorbing unit 10. By virtue of this, the liquid absorber 100 collects more waste liquid than in the related art, thereby making the image-forming apparatus 200 less prone to defects such as waste liquid leakage.

3. First Variation

The following describes a liquid absorber according to a first variation of the above embodiment.

Figure 6:
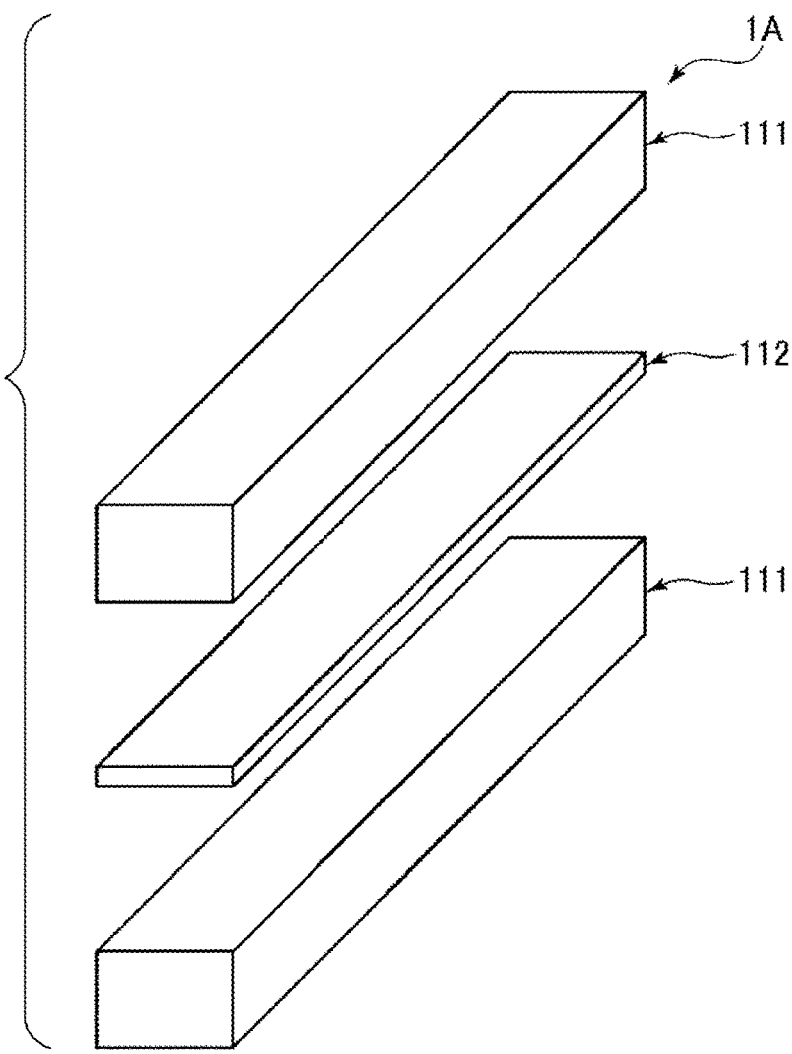
FIG. 6 is an exploded perspective diagram illustrating a first variation of a porous absorbent block according to an embodiment.

FIG. 6 is an exploded perspective diagram illustrating a first variation of a porous absorbent block 1 according to the above embodiment.

The following description of the first variation focuses primarily on differences from the above embodiment rather than similarities. In FIG. 6, elements that are the same as in the above embodiment are referenced by the same numerals as in the above embodiment.

The porous absorbent block 1A illustrated in FIG. 6 has two first components 111 and one second component 112 interposed therebetween. The droplets of the waste ink Q falling down to the container 9 therefore come into contact with the first components 111 first, located outside, and penetrate them quickly. The waste liquid then passes through the first components 111 and is quickly delivered to the second component 112. Then the waste liquid is absorbed and retained by the second component 112. The porous absorbent block 1A illustrated in FIG. 6 is therefore advantageous in that the waste liquid is unlikely to stay, particularly near the surface of the block 1A. Porous absorbent blocks 1A as illustrated in FIG. 6 are therefore quicker to absorb and retain the waste liquid.

Such a first variation, too, provides the same advantages as the above embodiment.

In this embodiment, the number of first components 111 and that of second components 112 are not critical. There may be three or more first components 111 and two or more second components 112.

4. Second Variation

The following describes a liquid absorber according to a second variation of the above embodiment.

Figure 7:
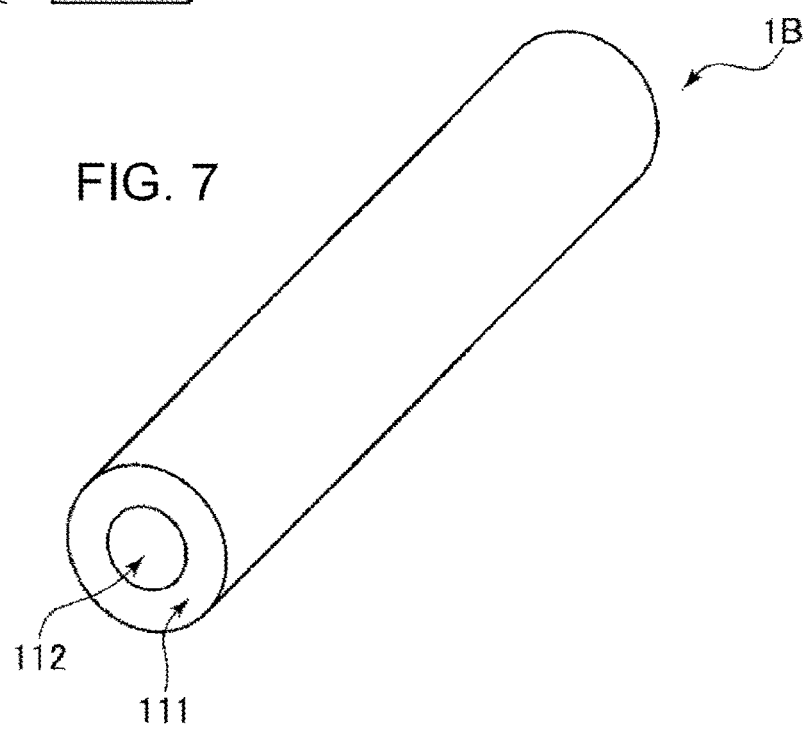
FIG. 7 is a perspective diagram illustrating a second variation of a porous absorbent block according to an embodiment.

FIG. 7 is a perspective diagram illustrating a second variation of a porous absorbent block 1 according to the above embodiment.

The following description of the second variation focuses primarily on differences from the above embodiment rather than similarities. In FIG. 7, elements that are the same as in the above embodiment are referenced by the same numerals as in the above embodiment.

The porous absorbent block 1B in FIG. 7 is cylindrical. The core, extending along the axis of the cylinder, is the second component 112, and the sheath, covering the core, is the first component 111. The porous absorbent block 1B illustrated in FIG. 7 therefore has concentric first and second components 111 and 112, with the second component 112 inside and the first component 111 outside. In such a structure, in which almost all of the surface of the porous absorbent block 1B is the first component 111, the waste ink Q that comes into contact with the porous absorbent block 1B penetrates more efficiently. The waste liquid that has penetrated is therefore delivered to the second component 112 quickly, making the porous absorbent blocks 1B better in both liquid permeability and liquid absorbency.

The porous absorbent blocks 1B as illustrated in FIG. 7 may be non-cylindrical, such as prismatic, or may even be spherical, lump-shaped, etc.

Such a second variation, too, provides the same advantages as the above embodiment.

5. Third Variation

The following describes a liquid absorber according to a third variation of the above embodiment.

Figure 8:
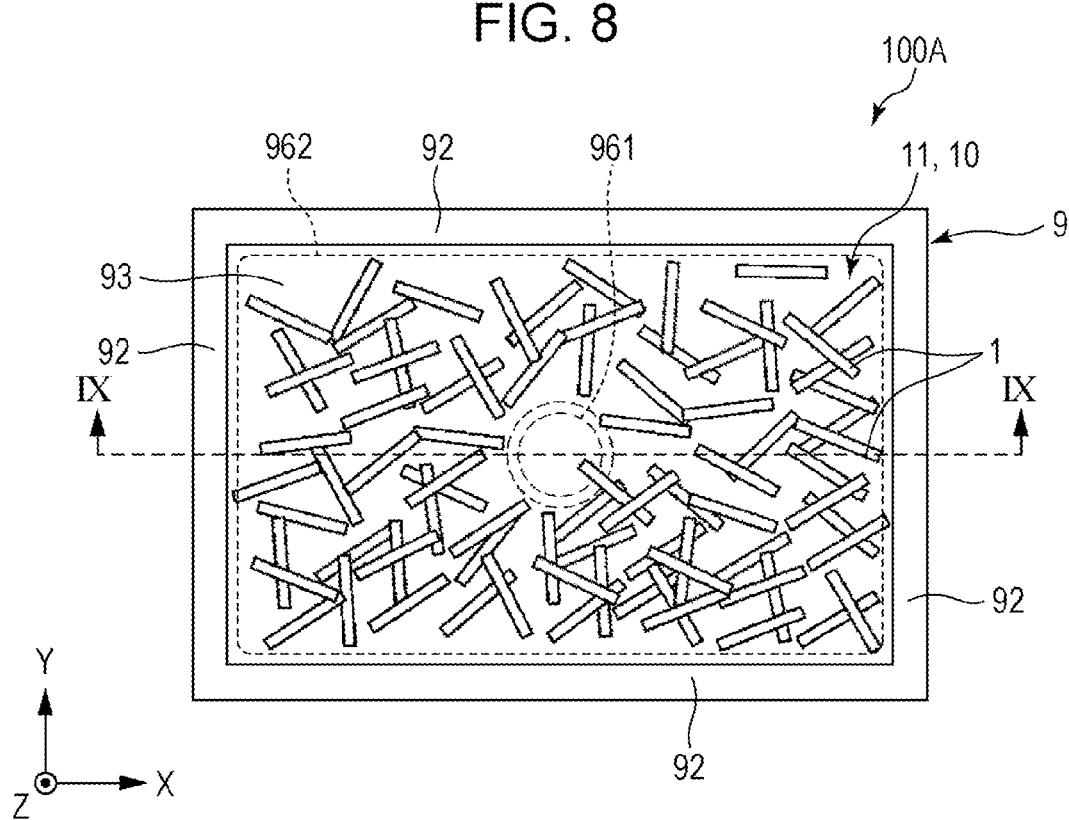
FIG. 8 is a plan diagram illustrating a liquid absorber according to a third variation of an embodiment.
Figure 9:
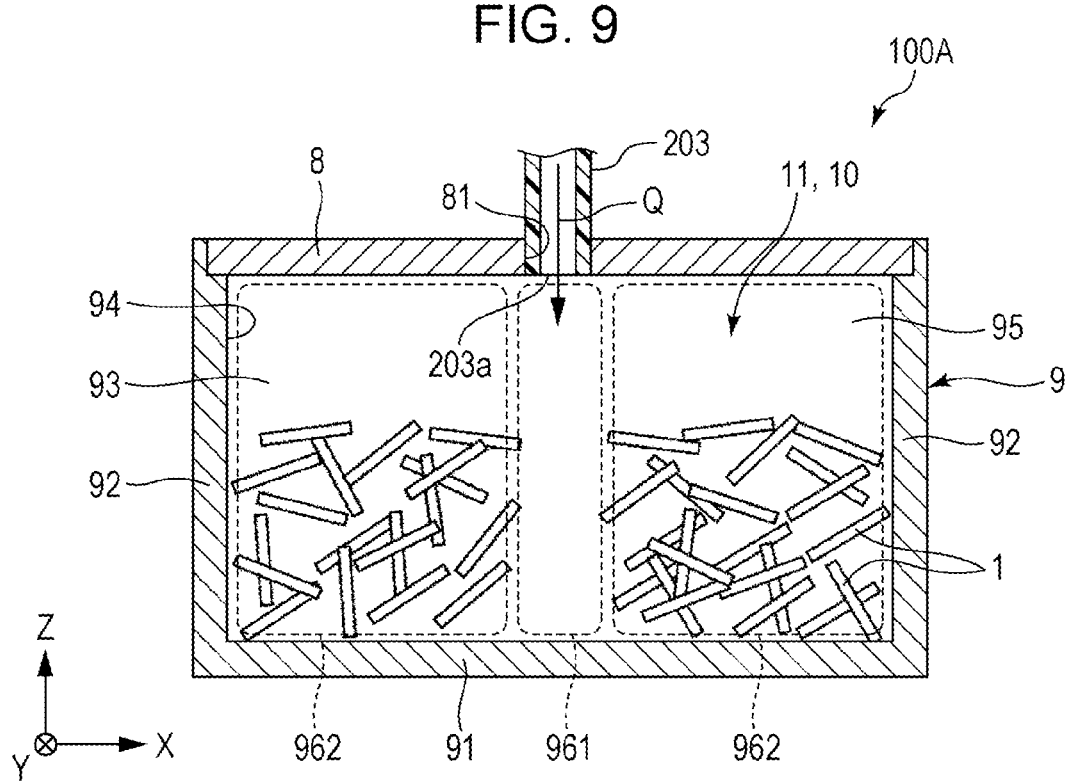
FIG. 9 is a cross-sectional view along line IX-IX in FIG. 8.

FIG. 8 is a plan diagram illustrating the liquid absorber according to the third variation of the above embodiment. FIG. 9 is a cross-sectional view along line IX-IX in FIG. 8.

The following description of the third variation focuses primarily on differences from the above embodiment rather than similarities. In FIGS. 8 and 9, elements that are the same as in the above embodiment are referenced by the same numerals as in the above embodiment.

In the liquid absorber 100A illustrated in FIGS. 8 and 9, the block assembly 11 in the storage space 93 has different bulk densities from part to part. Specifically, it is preferred that the block assembly 11 have a smaller bulk density in a "drop area" 961 than in a "non-drop area" 962. The drop area 961 is the area in the container 9 in which droplets of the waste ink Q, which is a liquid, fall onto, and the non-drop area 962 is all area in the container 9 excluding the drop area 961.

Such a configuration helps prevent droplets of the waste ink Q from staying in the drop area 961 after falling there. In such a configuration, in other words, the block assembly 11 has higher liquid permeability in the drop area 961 than in the non-drop area 962, and this ensures the droplets of the waste ink Q that fall onto the drop area 961 move quickly toward the non-drop area 962. By virtue of this, the whole volume of the liquid absorber 100A can be used to absorb the waste ink Q, and this efficient use of the absorbing unit 10 helps increase the absorber's capacity to absorb the waste liquid.

The bulk density of the block assembly 11 in the drop area 961 represents the calculated density of the block assembly 11 in an imaginary columnar region in the storage space 93 that extends above the area reached by splashing droplets of the waste liquid coming from the outlet 203a of the tube 203. Specifically, it is given by dividing the mass of the block assembly 11 included in this columnar region by the volume of the columnar region.

It should be noted that the columnar region extends all the way along the vertical axis of the storage space 93 and therefore includes an empty space 95, a space not occupied by the block assembly 11. A possible way to make the bulk density of the block assembly 11 lower in the drop area 961 is therefore to pile up the block assembly 11 lower in the drop area 961 than in the non-drop area 962 as illustrated in FIG. 9.

Likewise, the bulk density of the block assembly 11 in the non-drop area 962 is the calculated density of the block assembly 11 in an imaginary columnar region in the storage space 93 that extends above the area excluding the drop area 961.

The container 9 may have a partition or similar structure (not illustrated) between the drop area 961 and the non-drop area 962. Such a structure helps the block assembly 11 maintain the difference in bulk density even when the liquid absorber 100A is tilted.

When a partition, for example, is used, the porous absorbent blocks 1 in the drop area 961 and those in the non-drop area 962 may have different structures. Specifically, sets of porous absorbent blocks 1 differing in geometric parameters, such as length, aspect ratio, and curvature, will have different bulk densities when formed into a block assembly 11. This can be used to create a difference in the bulk density of the block assembly 11 even when, for example, the block assembly 11 is piled up to the same height between the two areas.

The partition in the storage space 93 may be integral with the container 9 or may be separate from the container 9. The partition may be prepared from the same materials as the porous absorbent blocks 1.

Such a third variation, too, provides the same advantages as the above embodiment.

6. Fourth Variation

The following describes a liquid-absorbing sheet and a liquid absorber according to a fourth variation of the above embodiment.

6.1. Liquid-Absorbing Sheet

A liquid-absorbing sheet according to this embodiment includes a paper sheet and a polymeric absorbent supported thereon. The paper sheet is formed by fibers bound by a binder and has a density of 0.05 g/cm$^3$ or more and 0.5 g/cm$^3$ or less.

6.1.1. Paper Sheet

The paper sheet is formed by fibers bound by a binder. The following describes the binder and fibers.

6.1.2. Binder

The binder, which binds fibers in the paper sheet, contains a resin. The resin as a component of the binder can be a natural or synthetic resin, and can be a thermoplastic or thermosetting resin. Resins that become tacky by taking in water, such as water-soluble resins, can also be used. Preferably, the resin in the binder is solid at room temperature. Given that heat is used to bind the fibers, thermoplastic resins are more preferred.

In the paper sheet, the binder can be in any external shape. For example, the binder may be spherical, disk-shaped, or may have an indefinite shape. When the production process for the paper sheet involves compression and heating, the binder may have lost its shape.

Assuming that the binder is spherical in the paper sheet, it is preferred that the volume-average diameter of its particles be 0.1 µm or more and 1000.0 µm or less for example, more preferably 1.0 µm or more and 100.0 µm or less.

The binder may contain a colorant, silica, titanium oxide, aluminum oxide, zinc oxide, cerium oxide, magnesium oxide, zirconium oxide, strontium titanate, barium titanate, calcium carbonate, etc. Extra ingredients may also be contained, such as organic solvents, surfactants, antimolds/preservatives, antioxidants/ultraviolet absorbers, and oxygen absorbers.

Preferably, the binder content is 5.0% by mass or more and 30.0% by mass or less, more preferably 7.0% by mass or more and 25.0% by mass or less, even more preferably 9.0% by mass or more and 20.0% by mass or less of the paper sheet.

When the binder content of the paper sheet is less than 5% by mass, the binder can fail to bind the fibers strongly enough. When the binder content exceeds 30% by mass, the paper sheet can have smaller empty space between the fibers due to penetration of the resin in the binder. This can affect the ability of the sheet to lift the liquid.

As described below, water may be applied to the paper sheet to help it support the polymeric absorbent. When the binder is a hydrophobic thermoplastic resin, this water tends not to be quickly absorbed but to be retained on the surface of the paper sheet. The polymeric absorbent in this case often absorbs the water and gels when sprinkled over the paper sheet. When this occurs, the polymeric absorbent may be supported more firmly on the paper sheet.

6.1.3. Fibers

The paper sheet contains fibers, and the fibers have been bound by a binder as described above. In the paper sheet, part of a fiber may be bound to another part by the binder, or two or more fibers may be bound together by the binder.

Preferably, the fibers in the paper sheet are cellulose fibers. Being hydrophilic, cellulose fibers retain the liquid supplied to the liquid-absorbing sheet 300 or bring it into contact with the water-absorbing resin 53 more readily than other types of fibers by virtue of their compatibility with the liquid.

Cellulose fibers are also highly compatible with water-absorbing resins 53. With this type of fibers, therefore, it is easier to make the water-absorbing resin 53 supported on the surface thereof. Owing to their naturally occurring and recyclable nature and particularly low prices and high availability, furthermore, cellulose fibers are also advantageous in terms of production cost, production stability, environmental burdens, etc. The cellulose fibers can be any fibrous material that is primarily the compound cellulose, and may contain hemicellulose and lignin besides cellulose.

Preferably, the fibers have an average length of 0.1 mm or more and 7.0 mm or less, more preferably 0.1 mm or more and 5.0 mm or less, even more preferably 0.1 mm or more and 3.0 mm or less. The average width of the fibers is preferably 0.5 µm or more and 200.0 µm or less, more preferably 1.0 µm or more and 100.0 µm or less. The average aspect ratio, i.e., the ratio of the average length to the average width, of the fibers is preferably 10 or more and 1000 or less, more preferably 15 or more and 500 or less. In such ranges, the water-absorbing resin 53 is supported better, and the fibers retain the liquid more firmly and bring it into contact with the water-absorbing resin more smoothly. As a result, the absorbent characteristics of the liquid-absorbing sheet 300 in absorbing the liquid improve.

When the average diameter of each individual fiber is averaged over all fibers, the result is 1 µm or more and 1000 µm or less, preferably 2 µm or more and 500 µm or less, even more preferably 3 µm or more and 200 µm or less. (For fibers whose cross-section is not round, the average diameter is replaced with the fiber's largest length in the direction perpendicular to the longitudinal direction or the diameter of an imaginary circle of equal area to the fiber's cross-section (equivalent circular diameter).) More preferably, the average thickness of the fibers is 0.5 µm or more and 200.0 µm or less.

The thickness and length of the fibers can be measured using, for example, Fiber Tester (Lorentzen & Wettre).

The paper sheet may contain substances other than the binder and fibers. Examples of such substances include colorants, aggregation inhibitors, and flame retardants. An example of an aggregation inhibitor is what is called nanoparticles, i.e., particles having an average diameter of approximately 0.001 µm to 1.0 µm, for example of silica, titanium oxide, aluminum oxide, zinc oxide, cerium oxide, magnesium oxide, zirconium oxide, strontium titanate, barium titanate, or calcium carbonate.

As for flame retardants, the manufacturer can use bromine flame retardants, chlorine flame retardants, phosphorus flame retardants, boron flame retardants, silicone flame retardants, nitrogen-containing compounds, and metal hydrate compounds, such as aluminum hydroxide, for example to comply with UL 94 HB or equivalent standards in a horizontal burning test (Method A as per IEC 60695-11-10 or ASTM D635). Other known substances can also be used, such as calcium carbonate, which is a nonflammable inorganic substance. When a flame retardant is used, it is good to make its percentage 5.0% by mass or more and 30.0% by mass or less, more preferably 7.0% by mass or more and 25.0% by mass or less, even more preferably 9.0% by mass or more and 20.0% by mass or less of the paper sheet.

6.1.4. Density of the Paper Sheet

The paper sheet as a component of the liquid-absorbing sheet according to this embodiment has a density of 0.05 g/cm$^3$ or more and 0.5 g/cm$^3$ or less. Preferably, the density of the paper sheet is 0.1 g/cm$^3$ or more and 0.45 g/cm$^3$ or less, more preferably 0.15 g/cm$^3$ or more and 0.4 g/cm$^3$ or less.

A density of less than 0.05 g/cm$^3$ can cause the paper sheet not to be strong enough for use as paper. When the density of the paper sheet exceeds 0.5 g/cm$^3$, the distance between fibers and particles of the binder is so small that the movement of the liquid in the paper sheet tends to be hindered. The liquid therefore diffuses inside the paper sheet only slowly. In cases such as when the liquid contains a solid, such as a pigment or resin particles, a paper sheet having a density of more than 0.5 g/cm$^3$ also tends to suffer what is called blocking, i.e., the closure of capillary-like structures formed between fibers therein. The degree of how smoothly a liquid diffuses inside the paper sheet may herein be referred to as "liquid diffusion."

6.1.5. Thickness of the Paper Sheet

The thickness of the paper sheet is not critical, but preferably is 0.13 mm or more and 5.0 mm or less. More preferably, the paper sheet has a thickness of 0.2 mm or more and 3.0 mm or less, even more preferably 0.3 mm or more and 2.0 mm or less. Paper sheets having a thickness in any of these ranges exhibit even better liquid diffusion.

6.2. Polymeric Absorbent

The liquid-absorbing sheet according to this embodiment includes a paper sheet as described above and a polymeric absorbent supported thereon. The polymeric absorbent is a superabsorbent polymer (SAP), a polymer that absorbs a liquid. Absorbing a liquid in this context refers to taking in nearby liquid molecules, such as water molecules, and retaining them. The polymeric absorbent may gel when it absorbs the liquid. Specifically, the polymeric absorbent absorbs water, hydrophilic organic solvents, etc., in the liquid.

The polymeric absorbent can be, for example, a water-absorbing resin as described above.

Preferably, the polymeric absorbent is a resin having an acid group. Examples of acid groups include the carboxyl, sulfonic acid, and phosphoric acid groups. Resins having a carboxylic group are more preferred than resins having other acid groups because they are easy to produce and readily available.

The polymeric absorbent can be in any external shape, such as spherical, flake-shaped, needle-like, fibrous, or particulate, but preferably is particulate in large part. Using a particulate polymeric absorbent is an easy way to ensure sufficient liquid permeability. A particulate polymeric absorbent, moreover, can be made supported on the fibers more easily than those in other shapes, for example by watering the paper sheet and then sprinkling the polymeric absorbent.

Preferably, the particles of the polymeric absorbent have an average diameter of 15.0 µm or more and 800.0 µm or less, more preferably 15.0 µm or more and 400.0 µm or less, even more preferably 15.0 µm or more and 50.0 µm or less. The average diameter and size distribution of the particles of the polymeric absorbent may be adjusted as necessary by milling and classification by ordinary methods.

The volume-average diameter of particles can be measured using, for example, a laser-diffraction particle size distribution analyzer. This type of analyzer gives the mean volume diameter, or MVD.

Preferably, the amount of polymeric absorbent contained (supported) is 1.0% by mass or more and 64.0% by mass or less of the liquid-absorbing sheet. More preferably, the polymeric absorbent content is 2.5% by mass or more and 40.0% by mass or less, even more preferably 5.0% by mass or more and 30.0% by mass or less of the liquid-absorbing sheet. Whatever structure the liquid-absorbing sheet has, it is preferred that the amount of supported polymeric absorbent be in any of these ranges.

6.3. Structure of the Liquid-Absorbing Sheet

Figure 10:
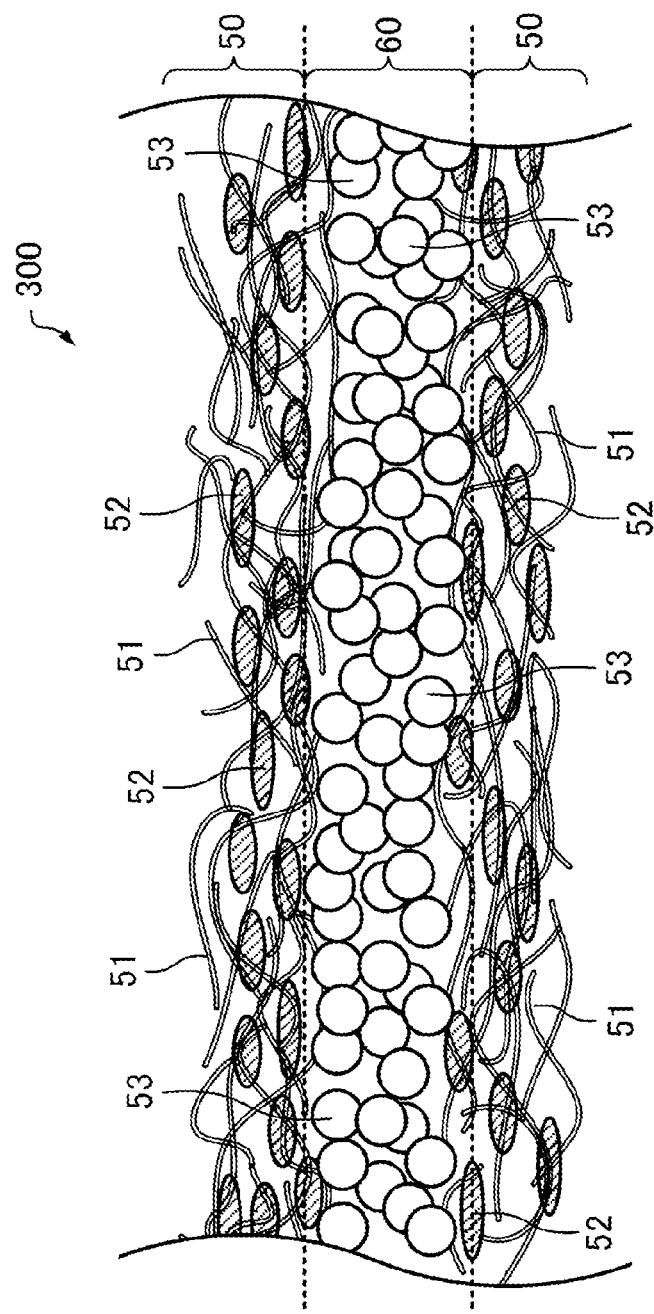
FIG. 10 is a schematic view of a cross-section of a liquid-absorbing sheet according to an embodiment.

FIG. 10 is a schematic diagram illustrating a cross-section of a liquid-absorbing sheet 300 according to an embodiment. The liquid-absorbing sheet 300 includes paper sheets 50 formed by fibers 51 bound by a binder 52 and a water-absorbing resin 53 as a polymeric absorbent.

The liquid-absorbing sheet 300 has a pair of paper sheets 50 and multiple particles of water-absorbing resin 53 therebetween. The particles of water-absorbing resin 53 have assembled together, forming a polymeric absorbent-containing layer 60. In other words, the liquid-absorbing sheet 300 has two paper sheets 50 and a polymeric absorbent-containing layer 60 formed therebetween. In the liquid-absorbing sheet 300, therefore, a water-absorbing resin 53 is supported between two paper sheets 50.

As stated, the paper sheets 50 have a relatively small density. The water-absorbing resin 53, therefore, may be present with part of it inside the paper sheets 50. The presence of such a form of water-absorbing resin 53 can blur the boundaries between the paper sheets 50 and the polymeric absorbent-containing layer 60, but even in that case, the liquid-absorbing sheet 300 can be deemed to have varying amounts of water-absorbing resin 53 along its thickness. In other words, when the liquid-absorbing sheet 300 is developed on a plane, the abundance of the water-absorbing resin 53 varies along the height of the liquid-absorbing sheet 300.

In the liquid-absorbing sheet 300, the water-absorbing resin 53 content peaks near the middle in the direction of thickness and is smaller near one and the other surfaces of the liquid-absorbing sheet 300.

Here, it is assumed that the liquid-absorbing sheet 300 is developed on a plane and sliced at points in the direction of thickness with imaginary parallel planes. The range (expanse in the direction of thickness) within which the water-absorbing resin 53 touches any such plane is herein defined as a polymeric absorbent-containing layer 60. In the illustrated case, therefore, the boundaries between the polymeric absorbent-containing layer 60 and the paper sheets 50 are the planes that pass through the deepest points of the water-absorbing resin 53 inside the paper sheets 50.

Preferably, the liquid-absorbing sheet 300 has a ratio of the thickness of the polymeric absorbent-containing layer 60 to that of the paper sheets 50 of 0.01 or more and less than 3.0. This ratio is more preferably 0.05 or more and less than 2.5, even more preferably 0.1 or more and less than 2.0. Ensuring this ratio is in any such range will help further improve liquid diffusion and absorbent capacity.

The sandwich structure as in the liquid-absorbing sheet 300 may be formed by sandwiching a polymeric absorbent-containing layer 60 between two paper sheets 50 or may be formed by folding one paper sheet 50 and sandwiching a polymeric absorbent-containing layer 60 between the halves of the folded sheet. In other words, the liquid-absorbing sheet 300 may have a structure in which the water-absorbing resin 53 is between a portion of a paper sheet 50 and another portion folded thereover or between a paper sheet 50 and another paper sheet 50 formed by fibers bound by a binder.

More preferably, the water-absorbing resin 53 is exposed on an end face of the liquid-absorbing sheet 300. To be more specific, the liquid-absorbing sheet 300 has open ends; the two paper sheets 50 are not in firm contact with each other at the ends, leaving a gap therebetween. It is more preferred that the water-absorbing resin 53 be seen when this gap is viewed in the direction parallel to the liquid-absorbing sheet 300. A state like where the water-absorbing resin 53 is seen when an end face of the liquid-absorbing sheet 300 is looked at is herein expressed as "the polymeric absorbent being exposed on an end face of the liquid-absorbing sheet."

The end face of the liquid-absorbing sheet 300 on which the water-absorbing resin 53 is exposed only needs to be at least part of the periphery of the liquid-absorbing sheet 300 in plan view; it may extend around the entire periphery or may be limited to part of the periphery.

When the water-absorbing resin 53 is exposed on an end face of the liquid-absorbing sheet 300, the liquid supplied to be absorbed by the liquid-absorbing sheet 300 comes into direct contact with the water-absorbing resin 53. This helps further improve the absorption of the liquid by the liquid-absorbing sheet 300.

The thickness of the liquid-absorbing sheet 300 is preferably 0.3 mm or more and 12.0 mm or less, more preferably 1.0 mm or more and 10 mm or less.

Figure 11:
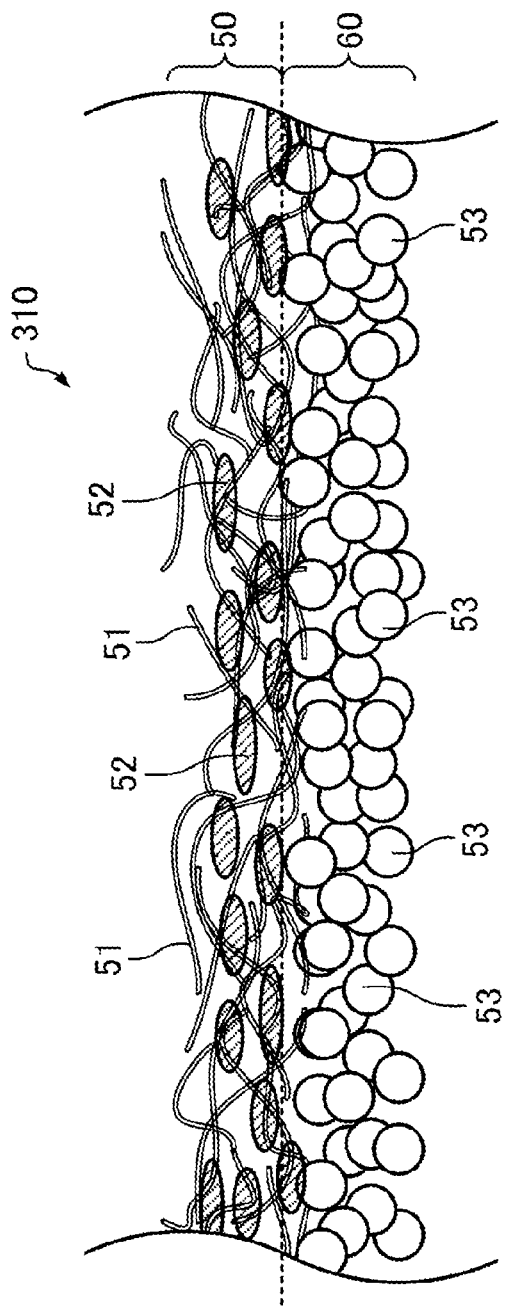
FIG. 11 is a schematic view of a cross-section of a liquid-absorbing sheet according to an embodiment.

FIG. 11 is a schematic diagram illustrating a cross-section of a liquid-absorbing sheet 310 according to an embodiment. Similar to the liquid-absorbing sheet 300, the liquid-absorbing sheet 310 includes a paper sheet 50 formed by fibers 51 bound by a binder 52 and a water-absorbing resin 53.

The liquid-absorbing sheet 310 has one paper sheet 50 and multiple particles of water-absorbing resin 53 supported thereon. The particles of water-absorbing resin 53 have assembled together, forming a polymeric absorbent-containing layer 60. In other words, the liquid-absorbing sheet 310 has one paper sheet 50 and a polymeric absorbent-containing layer 60 on one side thereof.

In this liquid-absorbing sheet 310, too, the water-absorbing resin 53 may be present with part of it inside the paper sheet 50 due to the relatively small density of the paper sheet 50. The liquid-absorbing sheet 310 also has varying amounts of water-absorbing resin 53 along its thickness. In other words, when the liquid-absorbing sheet 310 is developed on a plane, the abundance of the water-absorbing resin 53 varies along the height of the liquid-absorbing sheet 310.

In the liquid-absorbing sheet 310, the water-absorbing resin 53 content peaks near one surface in the direction of thickness and is the smallest near the other surface of the liquid-absorbing sheet 310.

For a configuration in which the polymeric absorbent-containing layer 60 is on one side as in the liquid-absorbing sheet 310, it is preferred that the ratio of the thickness of the polymeric absorbent-containing layer 60 to that of the paper sheet 50 be 0.01 or more and less than 2.0. More preferably, this ratio is 0.03 or more and less than 2.0, even more preferably 0.05 or more and less than 1.5. This leads to more stable support of the water-absorbing resin 53.

The thickness of the liquid-absorbing sheet 310 is preferably 0.15 mm or more and 6.0 mm or less, more preferably 0.5 mm or more and 5.0 mm or less.

6.4. Chips

The liquid-absorbing sheet 300 may have any two-dimensional size. For example, the two-dimensional size of the liquid-absorbing sheet 300 may be A4. The two-dimensional size of the liquid-absorbing sheet 300 may be that after the liquid-absorbing sheet 300 is finely cut, coarsely milled, or pulverized, for example using scissors or a paper shredder, or hand-torn into small pieces. Small fragments of a liquid-absorbing sheet 300, for example produced by cutting or tearing the liquid-absorbing sheet 300, may herein be referred to as "chips." Chips are a form of porous absorbent blocks 1.

Figure 12:
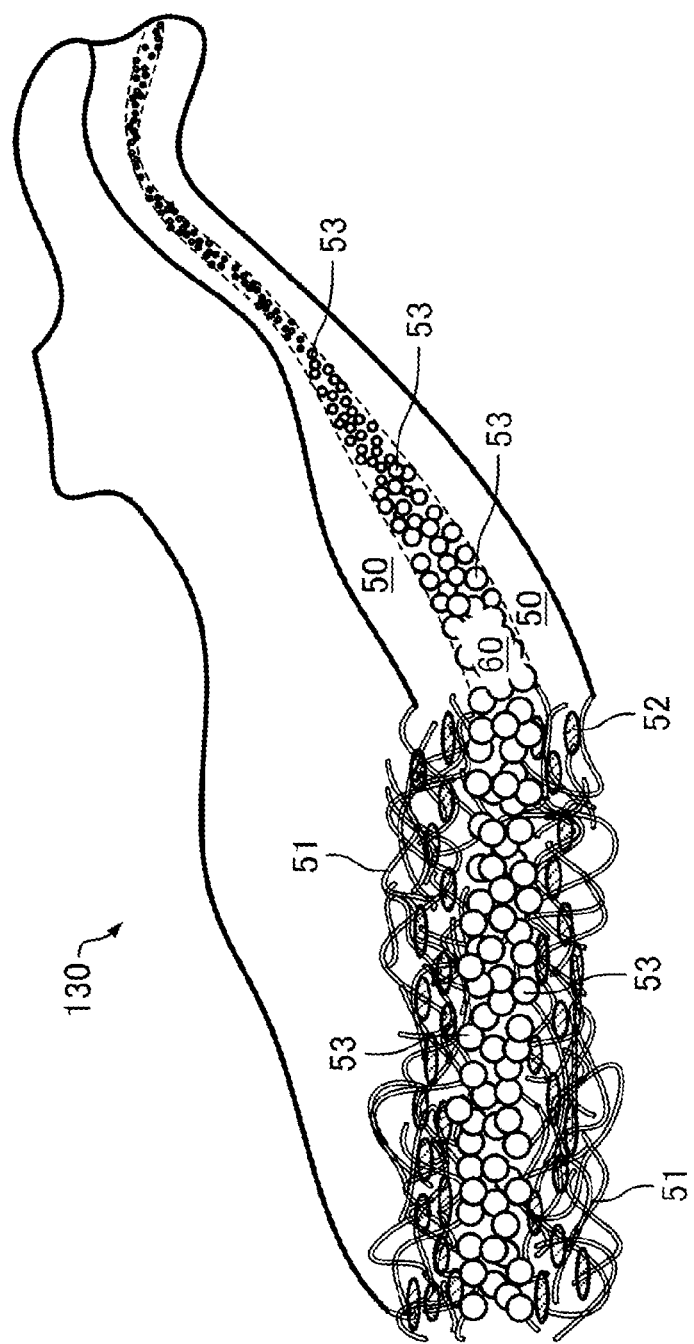
FIG. 12 is a perspective diagram schematically illustrating a chip according to an embodiment.

FIG. 12 is a perspective diagram schematically illustrating a chip 130 as a form of a porous absorbent block 1. For the sake of brevity, the paper sheets 50 of the chip 130 in FIG. 12 are only drawn with macroscopic outlines, the fibers 51 and binder 52 therein not illustrated, except on one of their sides.

The chips can be produced by finely cutting, coarsely milling, or pulverizing the liquid-absorbing sheet 300, for example using scissors, a utility knife, a mill, or a paper shredder, or hand-tearing the liquid-absorbing sheet 300 into small pieces. The form and structure of the paper sheets 50 and polymeric absorbent-containing layer 60 (water-absorbing resin 53) in the chips are the same as in the liquid-absorbing sheet 300.

For the chips 130, too, the liquid supplied to be absorbed by the chips 130 comes into direct contact with the water-absorbing resin 53 when the water-absorbing resin 53 is exposed on an end face of the liquid-absorbing sheet 300. This helps further improve the absorption of the liquid by the chips 130.

Preferably, the mean L2/L1 of the chips 130 is greater than 0.0 and 0.95 or less, where L1 is the overall length [mm], in the longitudinal direction, of a chip 130 and L2 is the end-to-end distance [mm], or the distance from one to the other end, of the chip 130. The mean L2/L1 is more preferably 0.01 or more and 0.90 or less, even more preferably 0.05 or more and 0.85 or less.

Preferably, the chips 130 are flexible and strip-shaped. This ensures that the chips 130 are easy to handle, for example when they are packed into a container, by virtue of their high deformability.

The overall length, or length along the long sides, of the chips 130 is preferably 0.5 mm or more and 200.0 mm or less, more preferably 1.0 mm or more and 100.0 mm or less, even more preferably 2.0 mm or more and 30.0 mm or less.

The width, or length along the short sides, of the chips 130 is preferably 0.1 mm or more and 100.0 mm or less, more preferably 0.3 mm or more and 50.0 mm or less, even more preferably 1.0 mm or more and 10.0 mm or less.

The aspect ratio, between the overall length and the width, of the chips 130 is preferably 1 or more and 200 or less, more preferably 1 or more and 30 or less. The thickness of the chips 130 is preferably 0.3 mm or more and 12.0 mm or less, more preferably 1.0 mm or more and 10 mm or less, similar to that of the liquid-absorbing sheet 300.

In such ranges, the water-absorbing resin 53 is supported well, and the fibers 51 retain the liquid firmly and deliver it to the water-absorbing resin 53 smoothly. As a result, the chips 130 demonstrate good absorbent characteristics in absorbing the liquid.

6.5. Production of the Liquid-Absorbing Sheet

As stated, the liquid-absorbing sheet is produced by making a polymeric absorbent supported on a paper sheet. An example of a production method is simply by watering the paper sheet, sprinkling the wet paper sheet with the polymeric absorbent, and drying the polymer-coated sheet. This is because the polymeric absorbent, at least in part, swells and becomes sticky when the water supplied to the paper sheet touches it. This stickiness causes the polymeric absorbent to stick to the fibers or particles of the polymeric absorbent to stick together. Then water is removed, for example by drying. The structures formed by adhesion, however, are preserved, achieving the support of the polymeric absorbent on the paper sheet. Alternatively, the polymeric absorbent may be made supported on the paper sheet using an adhesive substance, such as a water-soluble resin. Chips can be formed by finely cutting, coarsely milling, or pulverizing the liquid-absorbing sheet, for example using scissors, a utility knife, a mill, or a paper shredder, or hand-tearing the liquid-absorbing sheet into small pieces.

6.6. Liquid Absorbent

Figure 13:
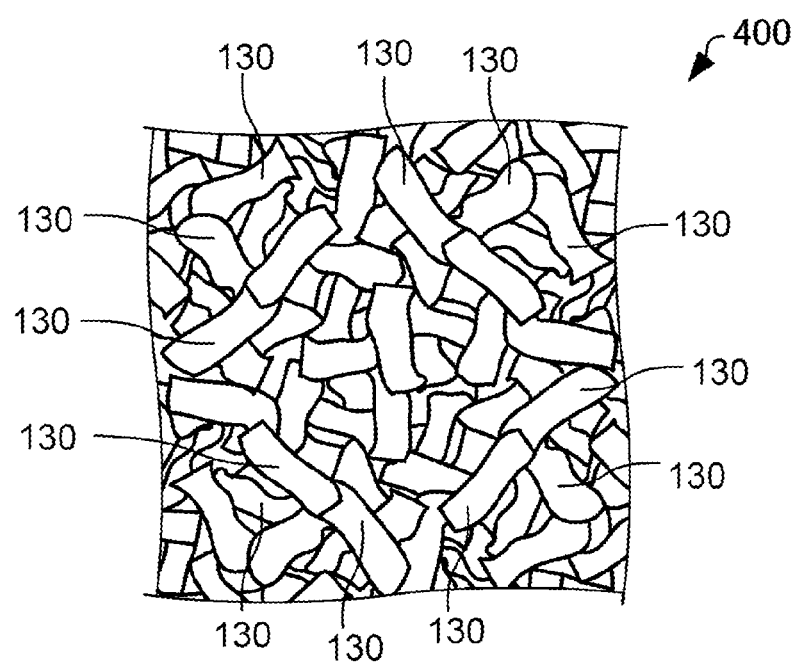
FIG. 13 is a diagram schematically illustrating a liquid absorbent according to an embodiment.

FIG. 13 is a diagram schematically illustrating a liquid absorbent 400 according to this embodiment. As illustrated in FIG. 13, the liquid absorbent 400 has multiple chips 130 as described above. That is, the liquid absorbent 400 is an assembly of chips 130. The liquid absorbent 400 can include any plural number of chips 130, but for example it includes 100 or more, preferably 200 or more, even more preferably 500 or more chips 130.

The liquid absorbent 400 may include chips 130 that are the same in at least one of overall length, width, aspect ratio, and thickness, or may include chips 130 that are different in all of these parameters.

Preferably, the multiple chips 130 forming the liquid absorbent 400 have a regular shape. This reduces the likelihood the liquid absorbent 400 will have uneven bulk density, thereby helping prevent unevenness in the absorbent characteristics of the liquid absorbent 400 in absorbing a liquid. The percentage of chips 130 that have a regular shape in the liquid absorbent 400 is 30% by mass or more, preferably 50% by mass or more, even more preferably 70% by mass or more of the liquid absorbent 400 as a whole.

Preferably, the multiple chips 130 forming the liquid absorbent 400 are arranged without any order, or spatially at random, for example so that their longitudinal axes will not be aligned but intersect. This facilitates the creation of spaces between the chips 130. The spaces between the chips 130 help ensure permeability to a liquid because the liquid can pass through the spaces and, when the spaces are microscopically small, can wet and spread by capillarity. For example, when the liquid absorbent 400 is in a container, such spaces help prevent the liquid flowing down in the container from being interrupted, ensuring that the liquid spreads toward the bottom of the container smoothly.

A spatially random packing of multiple chips 130 in a container also increases the chance of contact with the liquid for the liquid absorbent 400 as a whole, thereby giving the liquid absorbent 400 good absorbent characteristics in absorbing the liquid. The task of packing the liquid absorbent 400 into the container is also easy and quick because the manufacturer can put the chips 130 into the container randomly. Furthermore, when a liquid absorbent 400 formed by multiple chips 130 is packed into a container, and whatever the shape of the container is, the liquid absorbent 400 deforms and fits smoothly into the container by virtue of high deformability of the chips 130. Such a liquid absorbent 400 therefore has good shape compliance with its container.

Preferably, the bulk density of the liquid absorbent 400 is 0.01 $g/cm^3$ or more and 0.5 $g/cm^3$ or less, more preferably 0.03 $g/cm^3$ or more and 0.3 $g/cm^3$ or less, even more preferably 0.05 $g/cm^3$ or more and 0.2 $g/cm^3$ or less. This helps achieve liquid retention combined with liquid permeability.

The liquid absorbent 400 may further include other materials. Examples of such materials include surfactants, lubricants, defoamers, fillers, anti-blocking agents, ultraviolet absorbers, coloring agents, such as pigments and dyes, activated carbon, flame retardants, and flow improvers.

6.7 Liquid Absorber

The following describes a liquid absorber according to an embodiment with reference to drawings. FIG. 14 is a cross-sectional diagram schematically illustrating a liquid absorber 100B according to this embodiment. FIG. 15 is a plan diagram schematically illustrating the liquid absorber 100B according to an embodiment. FIG. 14 is a cross-sectional view along line XIV-XIV in FIG. 15.

As illustrated in FIGS. 14 and 15, the liquid absorber 100B includes a liquid absorbent 400, a receptacle 40 as a container, and a lid 30. For convenience purposes, FIGS. 14 and 15 illustrates the liquid absorbent 400 in its simplified view, and FIG. 15 does not illustrate a tube 203. The following describes each element.

6.7.1. Receptacle

The receptacle 40 holds a liquid absorbent 400 as described above. The liquid absorbent 400 is in the receptacle 40 as illustrated in FIG. 14. The receptacle 40 has, for example, a bottom 42 quadrilateral in plan view and four side walls 44 standing along the sides of the bottom 42. The receptacle 40 has an opening on top. The plan-view shape of the bottom 42 does not need to be quadrilateral but may be, for example, round.

The ratio V2/V1, where V1 is the capacity of the receptacle 40 and V2 is the total volume of the liquid absorbent 400 before absorbing ink, is 0.1 or more and 0.7 or less for example, preferably 0.2 or more and 0.7 or less.

Preferably, the receptacle 40 retains its shape to such an extent that it does not change its capacity V1 by 10% or more under an internal pressure or external force. This ensures the receptacle 40 maintains its shape even when the liquid absorbent 400 expands by absorbing a liquid, such as ink, and pushes the receptacle 40. The receptacle 40 therefore stays in a stable position, allowing the liquid absorbent 400 to absorb a liquid, such as ink, in a stable manner.

The material for the receptacle 40 can be, for example, a resin material, such as a cyclic polyolefin or polycarbonate, or a metallic material, such as aluminum or stainless steel.

6.7.2 Lid

The lid 30 closes the opening 46 of the receptacle 40. The lid 30 covers the liquid absorbent 400. The liquid absorbent 400 is between the lid 30 and the bottom 42 of the receptacle 40. The thickness of the lid 30 is preferably 50 µm or more and 5 mm or less, more preferably 100 µm or more and 3 mm or less. The lid 30 in the example illustrated in FIG. 15 is rectangular in plan view, but the lid 30 may have any shape in plan view.

The lid 30 has a hollow 32 toward the liquid absorbent 400 and a margin 34 that surrounds the hollow 32 in plan view. The hollow 32 is in the area onto which the ink is discharged. In plan view, for example, the hollow 32 is in an area that includes the center of the lid 30.

The hollow 32 has a bottom 32a and side walls 32b. In the illustrated example, the bottom 32a is quadrilateral in plan view. The side walls 32b stand along the sides of the bottom 32a. The area of the lid 30 onto which the ink is discharged is surrounded at least in part by the side walls 32b. The side walls 32b are connected to the bottom 32a. When a liquid, such as ink, is discharged from the tube 203, the tube 203 is inserted into the space defined by the hollow 32 as illustrated in FIG. 14, and then the liquid is discharged. The hollow 32 helps prevent the discharged liquid from foaming and spilling out. The hollow 32 is an effective structure especially when the liquid has a high surfactant content and easily foams.

The margin 34 is the portion of the lid 30 excluding the hollow 32. In the example illustrated in FIG. 15, the margin 34 surrounds the hollow 32 in plan view. The liquid absorbent 400 is thicker between the margin 34 and the bottom 42 of the receptacle 40 than between the hollow 32 and the bottom 42 of the receptacle 40.

The lid 30 has through holes 36 through which a liquid can pass. The through holes 36 are all the way through the thickness of the lid 30. The lid 30 has a surface 30a touching the liquid absorbent 400 and a surface 30b that is opposite the surface 30a. The through holes 36 extend from openings 36a in the surface 30a to openings 36b in the surface 30b. In the example illustrated in FIG. 14, the openings 36a and 36b are of the same shape and size. The through holes 36 are in the area of the lid 30 onto which the liquid is discharged.

The through holes 36 are in the hollow 32. In the illustrated example, the through holes 36 are in the bottom 32a and side walls 32b of the hollow 32 and also in the margin 34. The shape of the through holes 36 can be quadrilateral for example, and is square in the illustrated example. The through holes 36, however, do not need to be square. For example, they may be polygonal, such as rectangular, triangular, pentagonal, or hexagonal, round or oval, or even star-shaped, such as a hexagram.

The lid 30 has multiple through holes 36. The number of through holes 36 is not critical. In the example illustrated in FIG. 15, the through holes 36 are in a matrix, having a first direction and a second direction perpendicular to the first direction.

The material for the lid 30 can be, for example, a resin material, such as polypropylene (PP), polystyrene (PS), polyethylene (PE), polyurethane (PU), polyvinyl chloride (PVC), acrylonitrile-butadiene-styrene (ABS), polymethyl methacrylate (PMMA), acrylonitrile-styrene (AS), modified polyphenylene ether (PPE), polycarbonate (PC), polyamide (PA), polybutylene terephthalate (PBT), polyethylene terephthalate (PET), polyphenylene sulfide (PPS), polysulfone (PSU), polyacetal (POM), nylon, polyether ether ketone (PEEK), a tetrafluoroethylene-perfluoroalkyl vinyl ether copolymer (PFA), a tetrafluoroethylene-ethylene copolymer (ETFE), and polytetrafluoroethylene (PTFE).

The lid 30 may alternatively be a mesh of metal, for example made from wires of stainless steel, iron, or copper, or a perforated piece of such a metal. The surfaces 30a and 30b of the lid 30 and the inner surfaces of the through holes 36 may have been treated to be hydrophobic. Hydrophobic treatment helps prevent the accumulation of ink on the lid 30.

This liquid absorber 100B performs well in absorbing a liquid by virtue of a liquid absorbent 400 as described above packed in a receptacle 40 (container).

The foregoing description of a liquid absorber, a liquid absorbent, and an image-forming apparatus according to aspects of the present disclosure in their embodiments illustrated in the drawings is not meant to limit any aspect of the disclosure. Each structural element of the liquid absorber, liquid absorbent, and image-forming apparatus can be replaced with one having any other configuration that can provide the same function. There may be any component added to it.

A liquid absorber and a liquid absorbent according to aspects of the present disclosure can be used not only to absorb waste ink but also to absorb any other ink.

Liquid absorbers according to the foregoing embodiments can also be used as "ink leakage receivers," which absorb ink that has accidentally leaked out of an ink channel of an image-forming apparatus.

An aspect of the present disclosure may be a combination of two or more of the above embodiments.

EXAMPLES

The following describes specific examples of liquid absorbers according to an aspect of the present disclosure.

7. Preparation of Liquid Absorbers

Example 1

First, raw materials including nonwoven fabric, cellulose fibers (cotton from wood pulp), polyester fibers, and a flame retardant were mixed, the fibers were refined in the air, and the refined fibers were layered and compressed into a mat. This mat was for the formation of a first component.

Then paper was prepared as a sheet-shaped fibrous substrate. In this sheet of paper, the average length and average width of fibers were 0.71 mm and 0.2 mm, respectively. The aspect ratio, defined as average length/average width, was 3.56.

Then one side of the paper was sprayed with 2 cc of purified water. The sprayed side of the paper was treated with Sanyo Chemical Industries, Ltd.'s SANFRESH ST-500MPSA as a partially sodium polyacrylate crosslinked polyacrylic acid, which is a water-absorbing resin having a carboxyl group as a pendant acid group. This gave a substrate for the formation of a second component.

The mat, for the formation of a first component, and the substrate, for the formation of a second component, were stacked, and the stack was heated under pressure. Through this process the mat and substrate were joined together, giving a complex. The pressure was 0.3 kg/cm$^2$, and the heating temperature was 100° C. The duration of heating under pressure was 2 minutes.

The resulting complex was cut to give porous absorbent blocks. The thickness of the first component was 3.0 mm, and that of the second component was 1.5 mm. The primary surfaces of the porous absorbent blocks were rectangles measuring 30 mm along their long sides and 10 mm along their short sides. The density of the first component was as in Table 1.

The prepared porous absorbent blocks were loaded into a container having a cuboid storage space, giving an absorbent formed by an assembly of porous absorbent blocks. The bulk density of the absorbent was as in Table 1. The upper opening of the container used was rectangular, with its short sides measuring 100 mm. In this way, a liquid absorber was obtained.

Examples 2 to 11

A liquid absorber was obtained as in Example 1, except that the absorber configuration was changed as in Table 1.

Comparative Example 1

A liquid absorber was obtained as in Example 1, except that the porous absorbent blocks did not have a second component but only had a first component configured as in Table 1.

Comparative Example 2

A liquid absorber was obtained as in Example 1, except that the porous absorbent blocks did not have a first component but only had a second component configured as in Table 1.

Comparative Examples 3 and 4

A liquid absorber was obtained as in Example 1, except that the absorber configuration was changed as in Table 1.

8. Testing of the Liquid Absorbers 8.1. Range of Liquid Penetration

First, 250 cc of Seiko Epson Corporation's ICBK-61, a commercially available ink jet ink, was poured into the liquid absorber through its upper opening. Two minutes and five minutes later, the inside of the container was visually observed. The range of liquid penetration was graded according to the criteria below.

A: The ink spread substantially throughout the container.
B: The ink did not spread throughout but reached half or more of the inside of the container.
C: The ink reached 30% or more and less than half of the inside of the container.
D: The ink is staying and is found only near the point where the ink was supplied.

The test results are presented in Table 1.

8.2. Inversion Test

The liquid absorber loaded with ink in Section 8.1 was then turned upside down and kept in that position. Ink leakage from the container was measured for 30 minutes and graded according to the criteria below.

A: The ink leakage is very small.
B: The ink leakage is small.
C: The ink leakage is somewhat large.
D: The ink leakage is very large.

The test results are presented in Table 1.

TABLE 1

| | Liquid absorber production parameters | | | | | | Test results | | |
|---|---|---|---|---|---|---|---|---|---|
| | Thickness of the first component(s) mm | Thickness of the second component mm | First-to-second ratio by volume | Density of the first component(s) g/cm$^3$ | Bulk density of the block assembly g/cm$^3$ | Configuration of the first and second components | Range of penetration | | Inversion test |
| | | | | | | | 2 min | 5 min | 30 min |
| Example 1 | 0.1 | 0.5 | 0.2 | 0.50 | 0.30 A | First/Second | C | B | B |
| Example 2 | 0.5 | 0.5 | 1 | 0.50 | 0.50 A | First/Second | B | A | B |
| Example 3 | 1.0 | 0.5 | 2 | 0.08 | 0.60 A | First/Second | B | A | A |
| Example 4 | 3.0 | 0.5 | 6 | 0.16 | 0.60 A | First/Second | A | A | A |
| Example 5 | 7.0 | 0.5 | 14 | 0.16 | 0.50 A | First/Second | A | A | A |
| Example 6 | 10.0 | 0.5 | 20 | 0.32 | 0.75 A | First/Second | A | A | A |
| Example 7 | 15.0 | 0.5 | 30 | 0.44 | 0.75 A | First/Second | A | A | A |
| Example 8 | 20.0 | 0.5 | 40 | 0.16 | 0.50 A | First/Second | A | A | B |

TABLE 1-continued

| | Liquid absorber production parameters | | | | | | Test results | | |
|---|---|---|---|---|---|---|---|---|---|
| | Thickness of the first component(s) mm | Thickness of the second component mm | First-to-second ratio by volume — | Density of the first component(s) g/cm³ | Bulk density of the block assembly g/cm³ | Configuration of the first and second components — | Range of penetration | | Inversion test |
| | | | | | | | 2 min — | 5 min — | 30 min — |
| Example 9 | 20.0 | 0.05 | 400 | 0.16 | 0.50 A | First/Second | A | A | C |
| Example 10 | 10.0 | 10.0 | 1 | 0.16 | 0.20 A | First/Second | B | A | A |
| Example 11 | 8.0 | 0.5 | 16 | 0.16 | 0.50 A | First/Second/First | A | A | A |
| Comparative Example 1 | 7.0 | 0.0 | — | 0.16 | 0.50 A | A first component alone | A | A | D |
| Comparative Example 2 | 0.0 | 1.5 | — | — | 0.50 A | A second component alone | D | C | D |
| Comparative Example 3 | 7.0 | 0.5 | 14 | 0.03 | 0.15 A | First/Second | D | D | D |
| Comparative Example 4 | 7.0 | 0.5 | 14 | 0.56 | 0.90 A | First/Second | D | C | D |

As is clear from Table 1, in the Examples, the ink spread over a sufficiently broad range owing to the use of porous absorbent blocks having first and second components and an optimized density of the first component(s). The porous absorbent blocks were also able to be packed uniformly in their container. According to the results of the inversion test, furthermore, the use of such porous absorbent blocks also helps reduce ink leakage.

The same tests were repeated with Canon Inc.'s BCI-381sBK, Brother Industries, Ltd.'s LC3111BK, and Hewlett-Packard Japan, Ltd.'s HP 61XL CH563WA ink jet inks instead of Seiko Epson Corporation's ICBK-61. The results were the same.

9. Testing of Liquid-Absorbing Sheets

The following describes liquid-absorbing sheets according to an aspect of the present disclosure in detail by providing examples, but no aspect of the disclosure is limited to these Examples. In the following, "parts" and "%" are by mass unless stated otherwise.

9.1. Substrates and Liquid-Absorbing Sheets

Examples 12 to 26 and Comparative Examples 5 to 7

G80 copy paper (Toppan Forms) was dry-ground into fibers using T-250 turbo mill (Freund Turbo), and the resulting fibers were mixed in the air with a powered polyester binder (average particle diameter, 10 μm) and a phosphorus-nitrogen compound as a powder flame retardant (NONNEN R197-4, Marubishi Oil Chemical Co., Ltd.). The target percentages of the binder and the flame retardant were 10% by weight and 20% by weight, respectively. The mixture was vacuum-sieved through a 2-mm mesh screen with a mesh belt placed between the mixture and the vacuum source, and the sieved fibers were piled up to form a web. This web was heat-pressed to a predetermined density and heated at 100° C. for 60 seconds to soften the powdered binder resin. In this way, a substrate sheet (paper sheet) with fibers fixed together therein was prepared.

Two grams of water was applied to an A4 sheet of the substrate, and the watered side of the sheet was sprinkled evenly with a polymeric absorbent (SAP) (Sanyo Chemical ST-500MPSA) through a 0.1-mm mesh screen. The sheet was then folded with the SAP-coated surface inside and pressed in the same way as in the preparation of the substrate to yield an SAP-supporting liquid-absorbing sheet. The substrate and SAP-layer configurations in each Example or Comparative Example were as in Table 2.

9.2. Lifting Height

As a test specimen for a lifting height test, a 25 mm wide×100 mm long cut piece of the liquid-absorbing sheet was held upright. One end was immersed in Seiko Epson's pigment ink (mixture of Seiko Epson's black (ICXBK10), cyan (ICXC10), magenta (ICXM10), and yellow (ICXY10) inks in a ratio by mass of 3:1:1:1). The height of lifted ink at 30 minutes is reported herein. The lifting height is a measure of liquid diffusion, primarily of liquid-absorbing sheets.

Comparative Examples 5, 6, and 7 were to verify the range of densities the substrate sheet can have. In Comparative Example 5, the substrate sheet had a small density of 0.03. The binding between fibers was therefore so weak that the test specimen lost its shape and broke during the lifting height test. In Comparative Example 6, the substrate sheet was a sheet of G80 copy paper as it is. Due to the sheet's high density of 0.7, the lifting height was as small as 3 mm. In Comparative Example 7, a thick SAP layer was used with a thin substrate sheet (the ratio of the thickness of the SAP layer to that of the substrate was greater than 3). In this case, too, the lifting height was very small because the SAP spread into the substrate and blocked penetrating ink.

When the SAP-to-substrate ratio was smaller than 0.01, the sheet did not work as an absorbent because the amount of SAP was too small for the sheet to absorb a sufficient amount of liquid in the container.

Overall, densities in an approximate range of 0.05 to 0.5 g/cm³ were found to be good. With such a density, the substrate sheet absorbs a liquid to a height greater than a sheet of copy paper and retains its shape by virtue of binding between fibers. The thickness of the substrate ranged from 0.13 mm to 5 mm, and the percentage of SAP was from 5% to 64% by weight of the weight of the liquid-absorbing sheet.

In the Examples, the SAP was on one side of the substrate sheet and not exposed on the other side (see, for example, FIG. 11). Once the SAP spreads into the substrate sheet to an extent that it becomes exposed on the other side, the SAP fills the empty spaces between the fibers forming the substrate sheet, thereby affecting liquid lifting. It is therefore preferred to confine the SAP to one side of the substrate sheet and not to expose it on the other side as in FIG. 11.

TABLE 2

|  | Grammage of the paper sheet [g/m²] | Density of the paper sheet [g/cm³] | Thickness of the paper sheet [mm] | Grammage of the polymeric absorbent [g/m²] | Thickness of the polymeric absorbent-containing layer [mm] | Polymeric absorbent content [%] | Polymeric absorbent-to-paper sheet ratio by thickness [—] | Liquid lifting height [mm] | Liquid lifting height Grade | Ink retention in the container Grade |
|---|---|---|---|---|---|---|---|---|---|---|
| Example 12 | 64.0 | 0.05 | 1.28 | 11.3 | 0.08 | 15.0 | 0.06 | 56.0 | A | C |
| Example 13 | 64.0 | 0.20 | 0.32 | 11.3 | 0.08 | 15.0 | 0.24 | 36.0 | B | B |
| Example 14 | 64.0 | 0.50 | 0.13 | 11.3 | 0.08 | 15.0 | 0.60 | 16.0 | C | B |
| Example 15 | 64.0 | 0.24 | 0.27 | 118.9 | 0.81 | 65.0 | 3.00 | 10.0 | C | B |
| Example 16 | 100.0 | 0.05 | 2.00 | 17.6 | 0.12 | 15.0 | 0.06 | 65.0 | A | C |
| Example 17 | 100.0 | 0.20 | 0.50 | 5.3 | 0.04 | 5.0 | 0.07 | 48.0 | B | B |
| Example 18 | 100.0 | 0.20 | 0.50 | 17.6 | 0.12 | 15.0 | 0.24 | 44.0 | B | A |
| Example 19 | 100.0 | 0.20 | 0.50 | 66.7 | 0.45 | 40.0 | 0.91 | 42.0 | B | A |
| Example 20 | 100.0 | 0.20 | 0.50 | 185.7 | 1.26 | 65.0 | 2.53 | 38.0 | B | A |
| Example 21 | 100.0 | 0.50 | 0.20 | 17.6 | 0.12 | 15.0 | 0.60 | 15.0 | C | B |
| Example 22 | 300.0 | 0.06 | 5.00 | 15.8 | 0.11 | 5.0 | 0.02 | 80.0 | A | C |
| Example 23 | 300.0 | 0.06 | 5.00 | 52.9 | 0.36 | 15.0 | 0.07 | 75.0 | A | C |
| Example 24 | 300.0 | 0.20 | 1.50 | 52.9 | 0.36 | 15.0 | 0.24 | 60.0 | A | A |
| Example 25 | 300.0 | 0.50 | 0.60 | 52.9 | 0.36 | 15.0 | 0.60 | 24.0 | C | B |
| Example 26 | 300.0 | 0.06 | 5.00 | 3.1 | 0.05 | 1.0 | 0.01 | 82.0 | A | C |
| Comparative Example 5 | 100.0 | 0.03 | 3.33 | 17.6 | 0.12 | 15.0 | 0.04 | Unmeasurable due to breakage | D | D |
| Comparative Example 6 | 100.0 | 0.70 | 0.14 | 17.6 | 0.12 | 15.0 | 0.84 | 3.0 | D | D |
| Comparative Example 7 | 100.0 | 0.60 | 0.16 | 118.0 | 0.80 | 54.0 | 5.00 | 4.0 | D | D |

What is claimed is:

1. A liquid absorber comprising:
a container that has an opening and collects a liquid; and
an absorbing unit that is an assembly of porous absorbent blocks, each block containing fibers and a polymeric absorbent, and is in the container with spaces between the porous absorbent blocks, wherein
each of the porous absorbent blocks has:
a first component that is porous and has a density of 0.05 g/cm³ or more and 0.50 g/cm³ or less; and
a second component that has a higher polymeric absorbent content than the first component.

2. The liquid absorber according to claim 1, wherein the first component is free of the polymeric absorbent.

3. The liquid absorber according to claim 1, wherein each of the porous absorbent blocks is a stack of the first component in layer form and the second component in layer form.

4. The liquid absorber according to claim 1, wherein each of the porous absorbent blocks is a complex of the first component in chip form and the second component in chip form.

5. The liquid absorber according to claim 1, wherein a ratio V1/V2, where V1 is a volume of the first component and V2 is a volume of the second component, is 0.15 or more and 400 or less.

6. The liquid absorber according to claim 1, wherein:
the opening has a plurality of sides; and
a length of a longest side of the porous absorbent blocks is 5 mm or more and ½ or less of a length of a shortest side of the opening.

7. The liquid absorber according to claim 1, wherein:
the assembly has a smaller bulk density in a drop area than in a non-drop area, where
the drop area is an area in the container in which droplets of the liquid fall onto, and the non-drop area is all area in the container excluding the drop area.

8. A liquid-absorbing sheet comprising a paper sheet and a polymeric absorbent supported thereon, the paper sheet formed by fibers bound by a binder and having a density of 0.05 g/cm³ or more and 0.5 g/cm³ or less.

9. The liquid-absorbing sheet according to claim 8, wherein the paper sheet has a thickness of 0.13 mm or more and 5.0 mm or less.

10. The liquid-absorbing sheet according to claim 8, wherein
the fibers forming the paper sheet have an average length of 0.1 mm or more and 7 mm or less and an average thickness of 0.5 μm or more and 200.0 μm or less.

11. The liquid-absorbing sheet according to claim 8, wherein
the liquid-absorbing sheet contains varying amounts of the polymeric absorbent along a thickness thereof.

12. The liquid-absorbing sheet according to claim 8, wherein
a ratio of a thickness of a layer containing the polymeric absorbent to a thickness of the paper sheet is 0.01 or more and less than 3.0.

13. The liquid-absorbing sheet according to claim 8, wherein
the polymeric absorbent is present in an amount of 1.0% by mass or more and 64.0% by mass or less of the liquid-absorbing sheet.

14. The liquid-absorbing sheet according to claim 8, wherein
the binder is a thermoplastic resin and is present in an amount of 5.0% by mass or more and 30.0% by mass or less of the paper sheet.

15. The liquid-absorbing sheet according to claim 8, wherein
the liquid-absorbing sheet has the polymeric absorbent between a portion of the paper sheet and another portion folded thereover or between the paper sheet and another paper sheet formed by fibers bound by a binder.

16. The liquid-absorbing sheet according to claim 15, wherein
the polymeric absorbent is exposed on an end face of the liquid-absorbing sheet.

17. A liquid absorbent comprising an assembly of porous absorbent blocks, wherein each of the porous absorbent blocks has:

a first component that is porous and has a density of 0.05 g/cm$^3$ or more and 0.50 g/cm$^3$ or less; and a second component that has a higher polymeric absorbent content than the first component.

18. An image-forming apparatus comprising the liquid absorber according to claim 1.

19. An image-forming apparatus comprising a container that holds one or both of the liquid-absorbing sheet according to claim 8 and cut pieces thereof.

\* \* \* \* \*